US010895803B2

(12) United States Patent
Miura

(10) Patent No.: US 10,895,803 B2
(45) Date of Patent: Jan. 19, 2021

(54) ILLUMINATION DEVICE AND DISPLAY UNIT

(71) Applicant: Sony Corporation, Tokyo (JP)

(72) Inventor: Koji Miura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/169,228

(22) Filed: Oct. 24, 2018

(65) Prior Publication Data
US 2019/0113830 A1 Apr. 18, 2019

Related U.S. Application Data

(63) Continuation of application No. 15/511,024, filed as application No. PCT/JP2015/075702 on Sep. 10, 2015, now Pat. No. 10,146,118.

(30) Foreign Application Priority Data

Sep. 26, 2014 (JP) ................................. 2014-196721

(51) Int. Cl.
G03B 21/20 (2006.01)
H04N 9/31 (2006.01)
(Continued)

(52) U.S. Cl.
CPC ............ *G03B 21/208* (2013.01); *F21V 5/007* (2013.01); *F21V 5/008* (2013.01); *G02B 3/00* (2013.01);
(Continued)

(58) Field of Classification Search
CPC .. G03B 21/208; G03B 21/2033; G03B 33/12; G02B 19/0009; G02B 3/00; F21V 5/008;
(Continued)

(56) References Cited

U.S. PATENT DOCUMENTS 10,146,118 B2 12/2018 Miura
2010/0002217 A1* 1/2010 Fiolka ................. G02B 27/286
355/67

(Continued)

FOREIGN PATENT DOCUMENTS

EP 2693268 A1 2/2014
JP 2008-065260 A 3/2008
(Continued)

OTHER PUBLICATIONS

Japanese Office Action dated Aug. 13, 2019 in connection with Japanese Application No. 2016-550099 and English translation thereof.

(Continued)

*Primary Examiner* — Michelle M Iacoletti
*Assistant Examiner* — Danell L Owens
(74) *Attorney, Agent, or Firm* — Wolf, Greenfield & Sacks, P.C.

(57) ABSTRACT

A first illumination device includes a light source that emits light having directivity, and a uniform illumination optical system including a first fly-eye lens that includes a plurality of lenses two-dimensionally arranged and allows light based on emitted light from the light source to pass through the first fly-eye lens. An illumination target region has a planar shape having a side extending along a direction substantially parallel to a long-axis direction or a short-axis direction of an intensity distribution shape of emitted light from the light source, and a periodic direction of an array of the lenses in the first fly-eye lens is inclined with respect to the long-axis direction or the short-axis direction.

14 Claims, 18 Drawing Sheets

(51) Int. Cl.
  *F21V 5/00* (2018.01)
  *G03B 33/12* (2006.01)
  *G02B 19/00* (2006.01)
  *G02B 3/00* (2006.01)
  *F21Y 115/30* (2016.01)

(52) U.S. Cl.
  CPC ..... *G02B 19/0009* (2013.01); *G03B 21/2033* (2013.01); *H04N 9/3111* (2013.01); *H04N 9/3152* (2013.01); *H04N 9/3161* (2013.01); *H04N 9/3164* (2013.01); *F21Y 2115/30* (2016.08); *G03B 33/12* (2013.01)

(58) Field of Classification Search
  CPC .... F21V 5/007; H04N 9/3161; H04N 9/3152; H04N 9/3111; F21Y 2115/30
  See application file for complete search history.

(56) References Cited

U.S. PATENT DOCUMENTS

| | | | |
|---|---|---|---|
| 2011/0188003 A1 | 8/2011 | Furutachi et al. | |
| 2013/0321780 A1* | 12/2013 | Miura | G02B 27/09 353/94 |
| 2014/0002801 A1* | 1/2014 | Miura | H04N 9/3152 353/31 |
| 2017/0285452 A1 | 10/2017 | Miura | |

FOREIGN PATENT DOCUMENTS

| | | |
|---|---|---|
| JP | 2009-205025 A | 9/2009 |
| JP | 2011-164151 A | 8/2011 |
| JP | 2012-203392 A | 10/2012 |
| JP | 2012-226303 A | 11/2012 |
| JP | 2013-251222 A | 12/2013 |
| WO | WO 2012-132925 A1 | 10/2012 |

OTHER PUBLICATIONS

Japanese Office Action dated Oct. 8, 2019 in connection with Japanese Application No. 2016-550099 and English translation thereof.

International Search Report and Written Opinion and English translation thereof dated Dec. 15, 2015 in connection with International Application No. PCT/JP2015/075702.

International Preliminary Report on Patentability and English translation thereof dated Apr. 6, 2017 in connection with International Application No. PCT/JP2015/075702.

Japanese Office Action dated Feb. 4, 2020 in connection with Japanese Application No. 2016-550099 and English translation thereof.

\* cited by examiner

[FIG. 1]
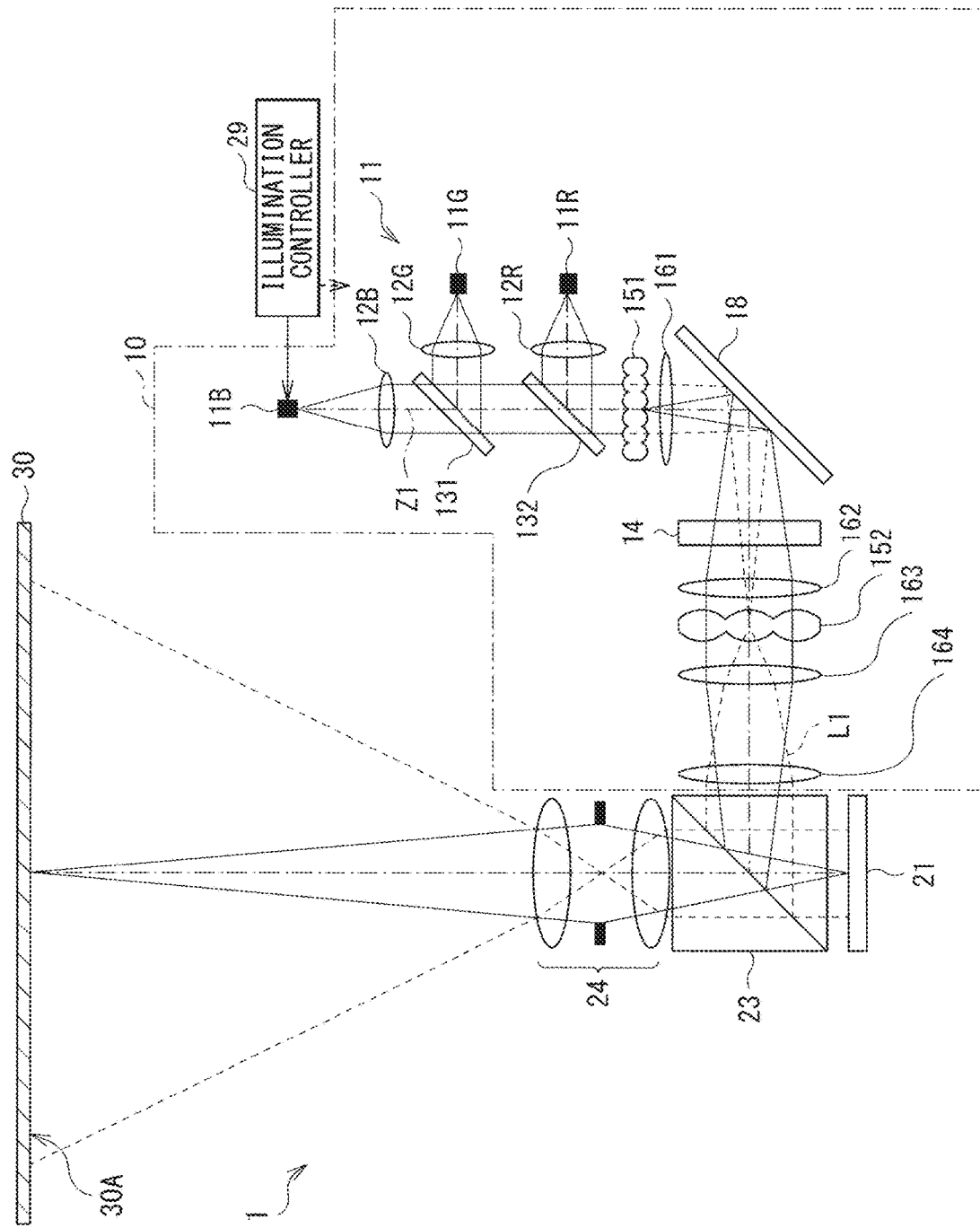

[ FIG. 2A ]
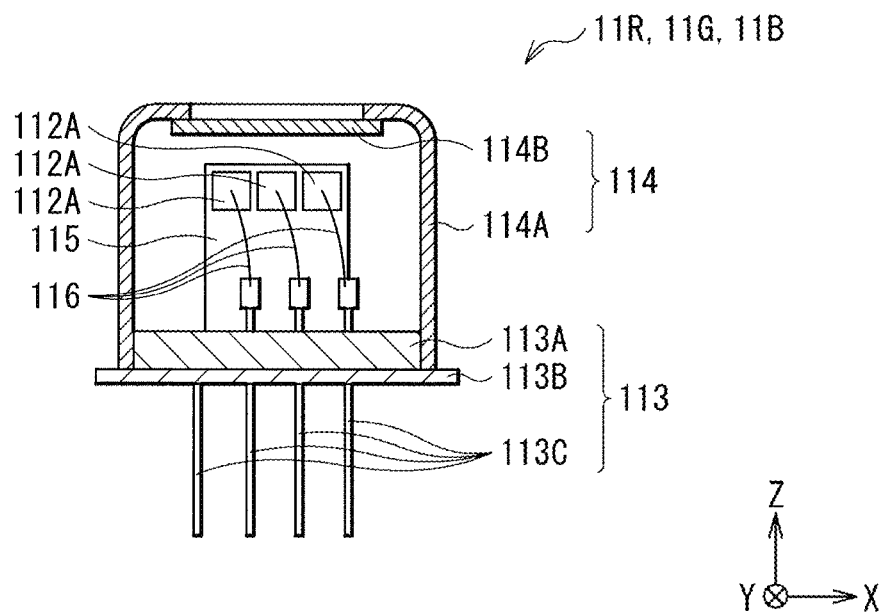
[ FIG. 2B ]
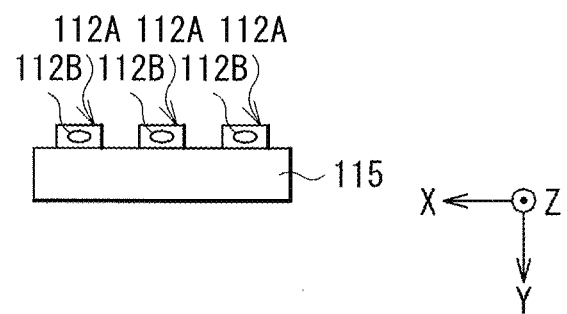

[FIG. 3A]
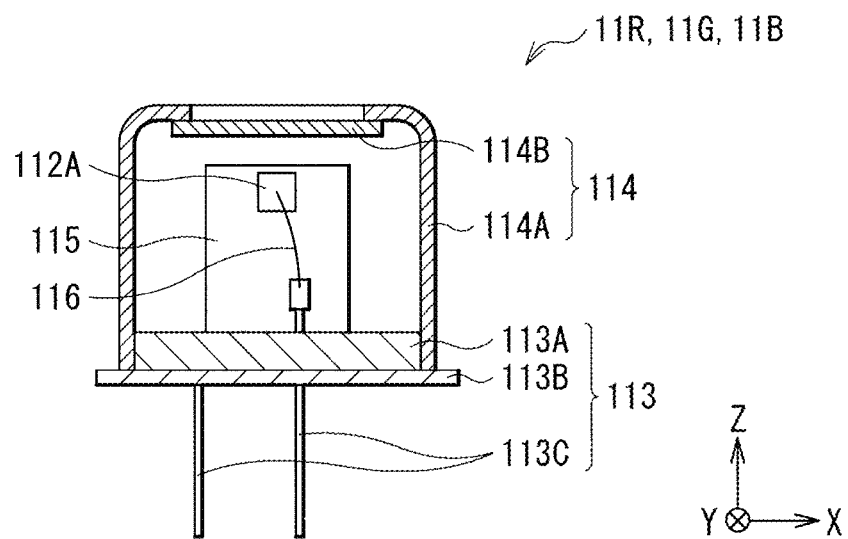
[FIG. 3B]
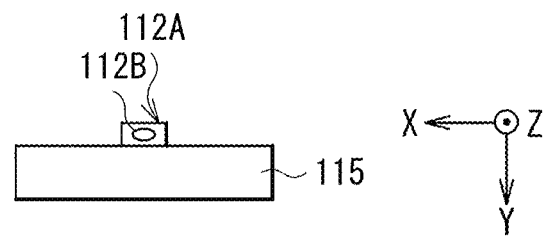
[FIG. 3C]
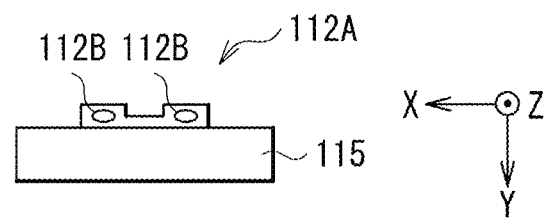

[ FIG. 4 ]
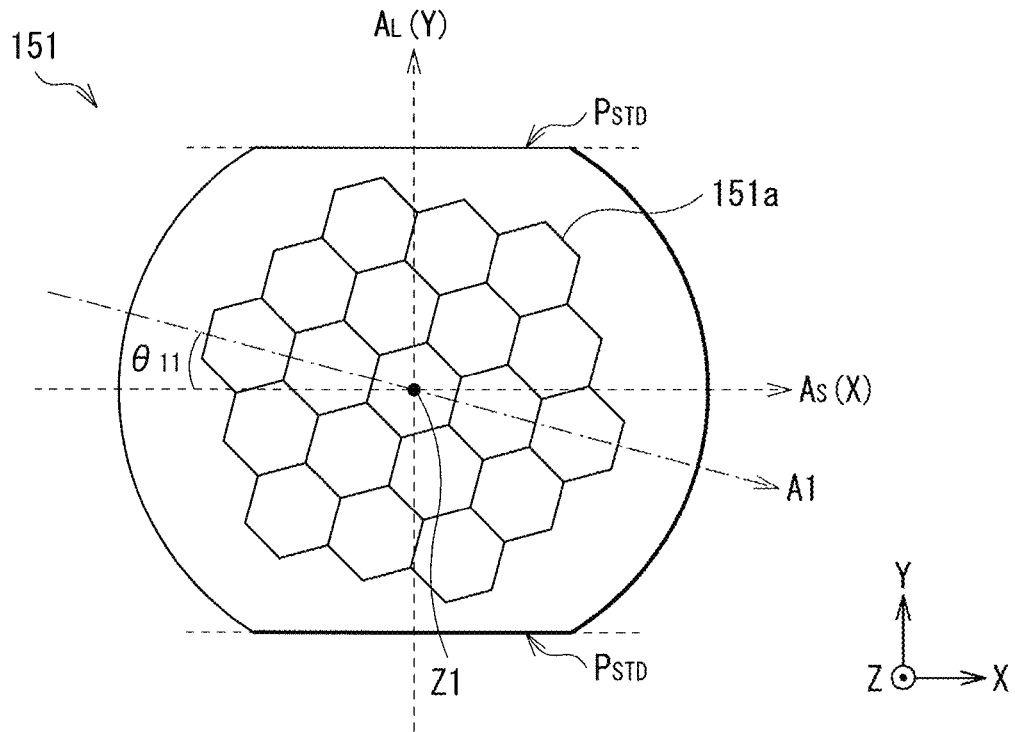
[ FIG. 5 ]
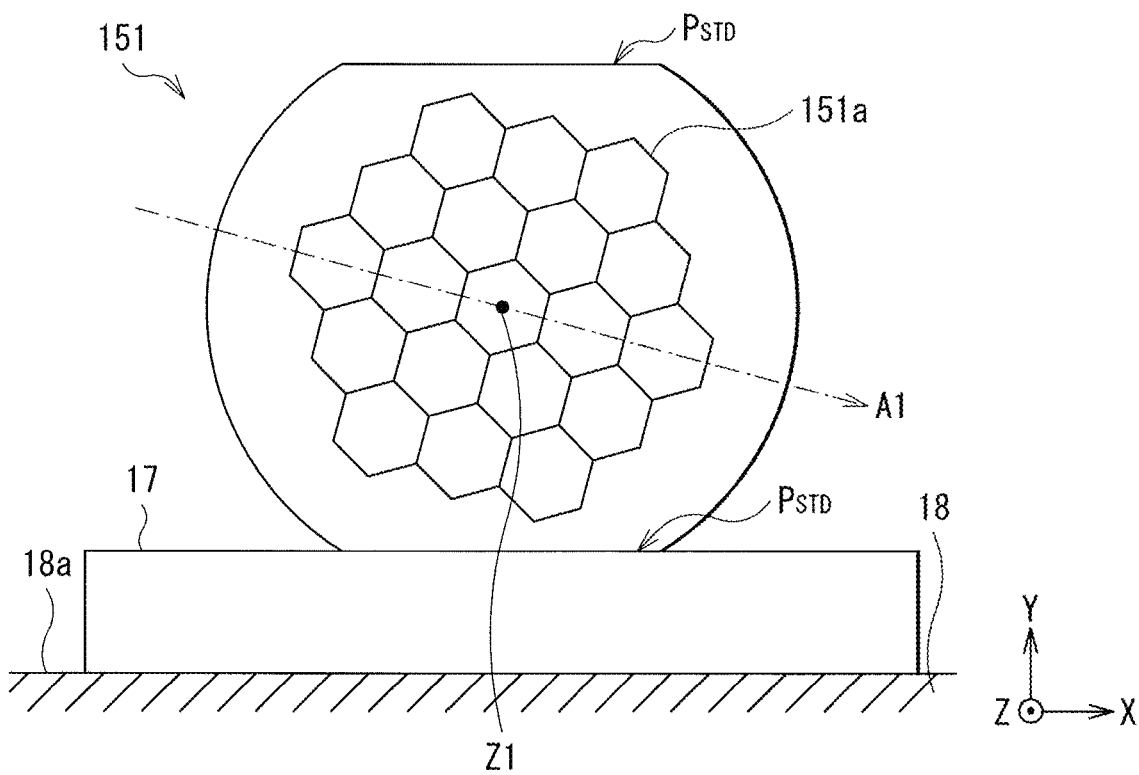

[ FIG. 6 ]
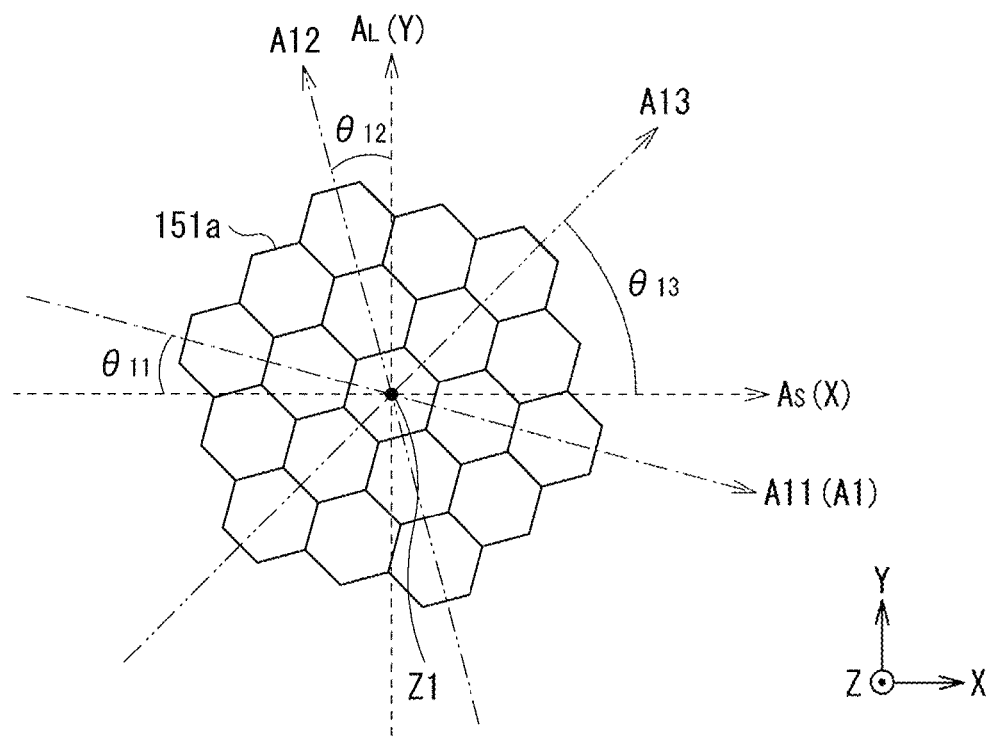

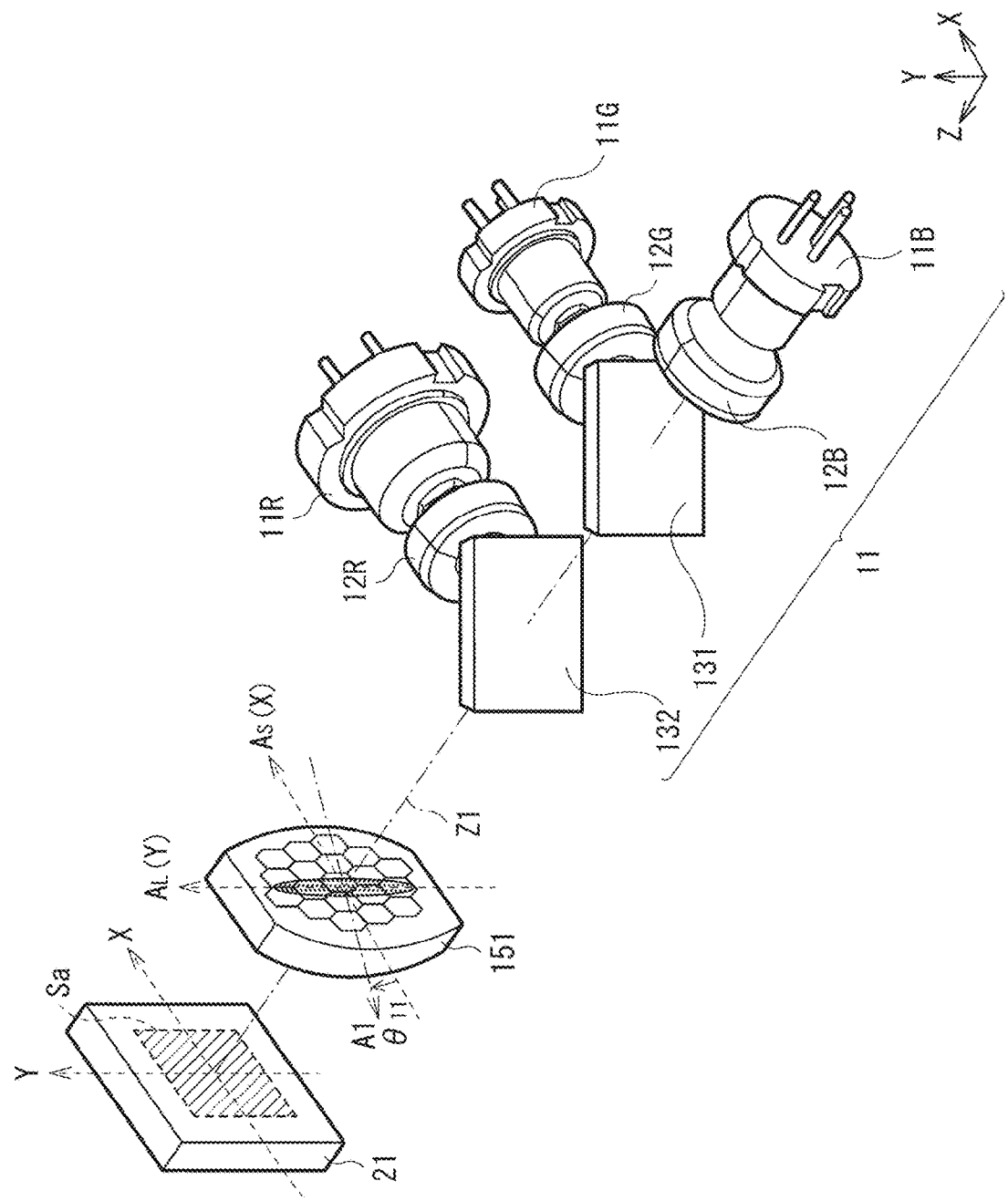
[FIG. 7]

[ FIG. 8 ]
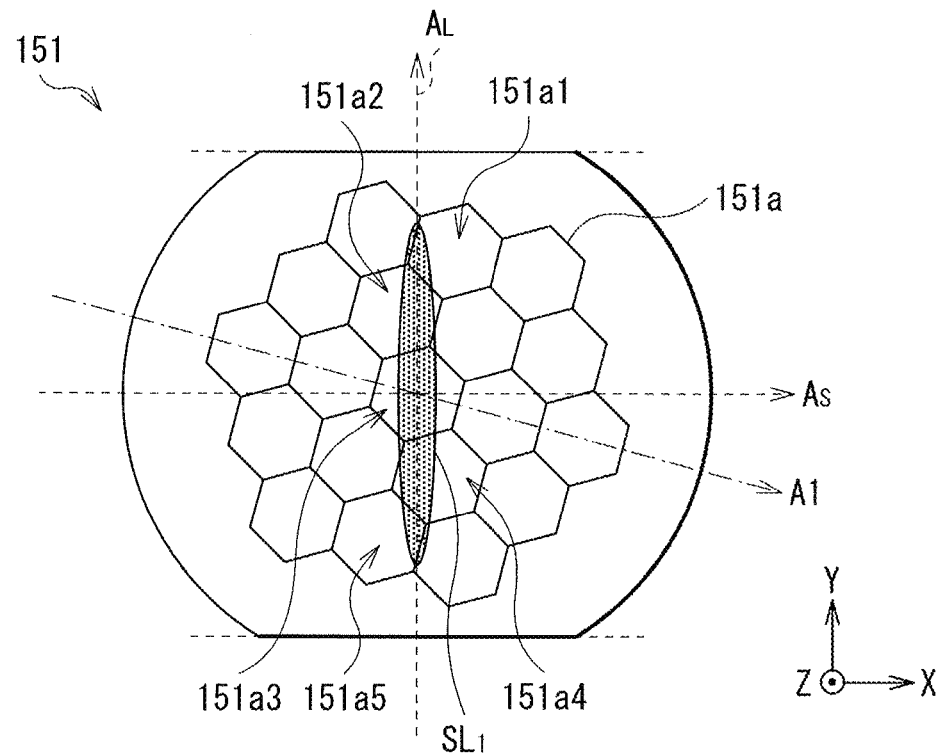
[ FIG. 9 ]
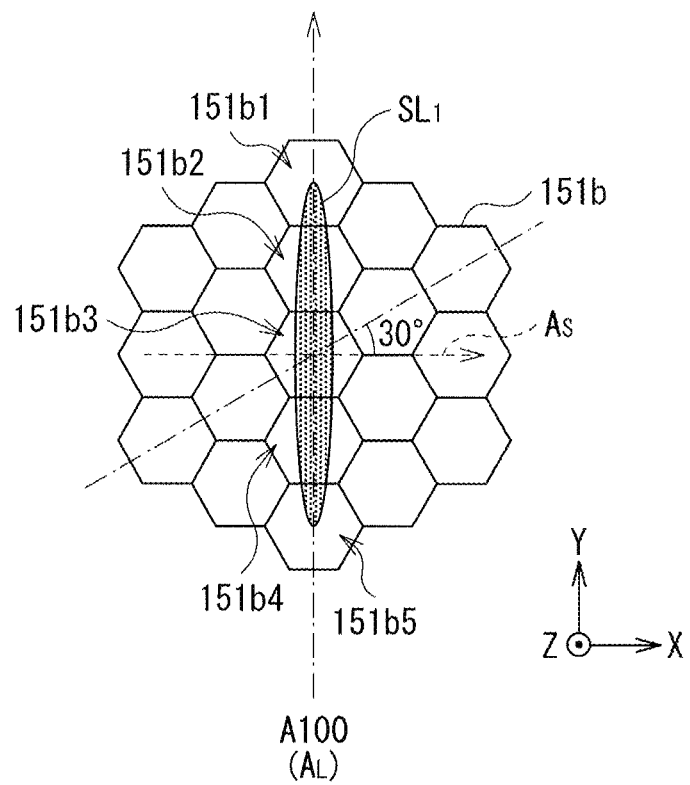

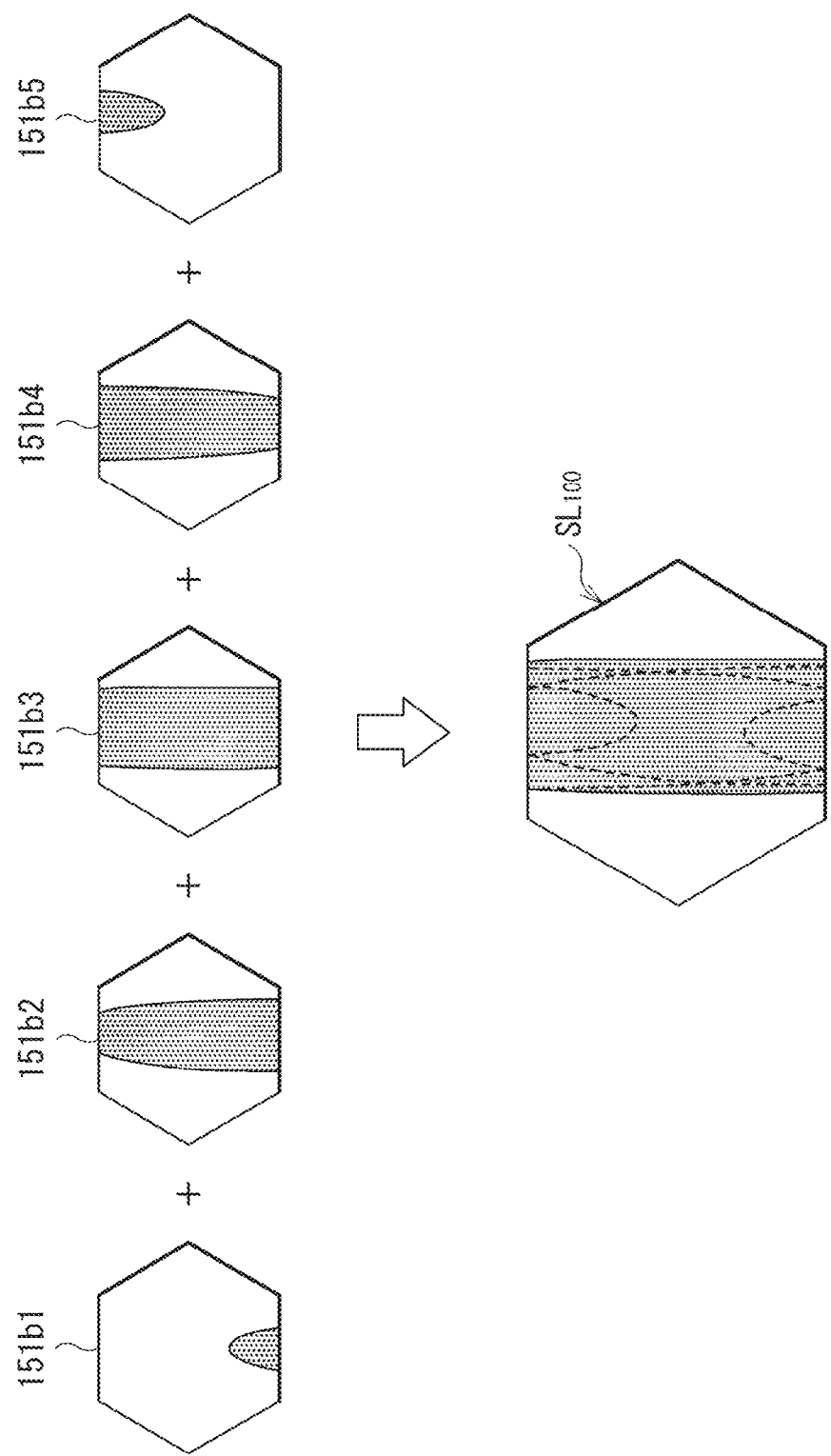
[FIG. 10]

[ FIG. 11A ]
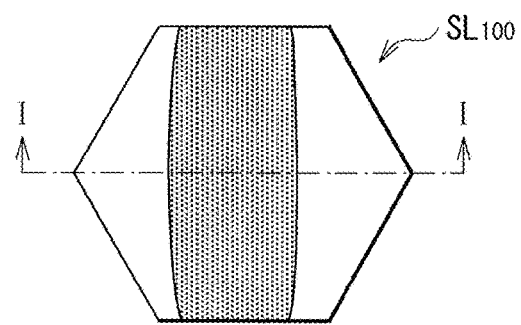
[ FIG. 11B ]
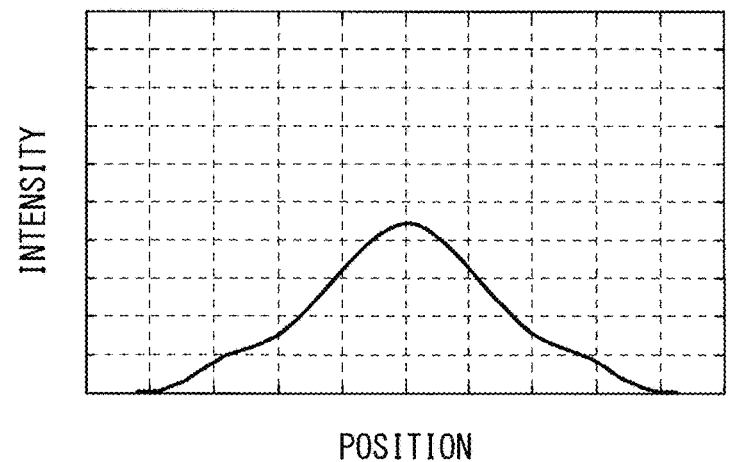
[ FIG. 12 ]
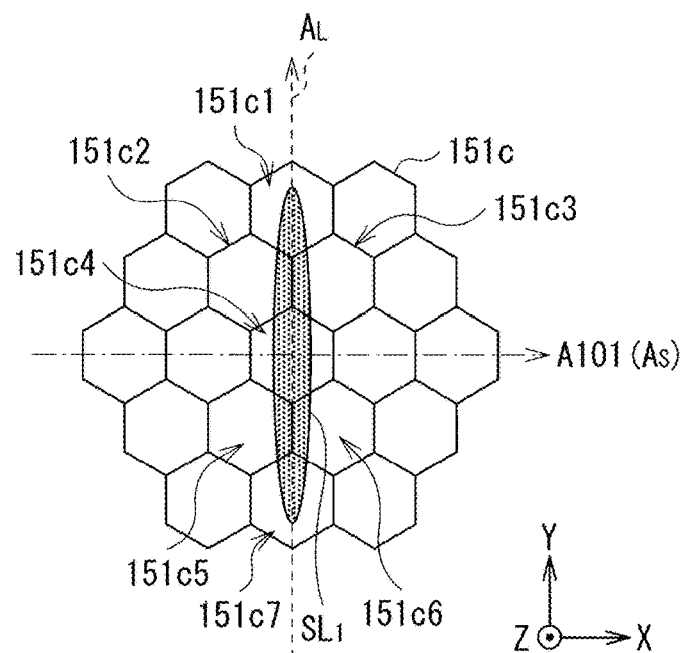

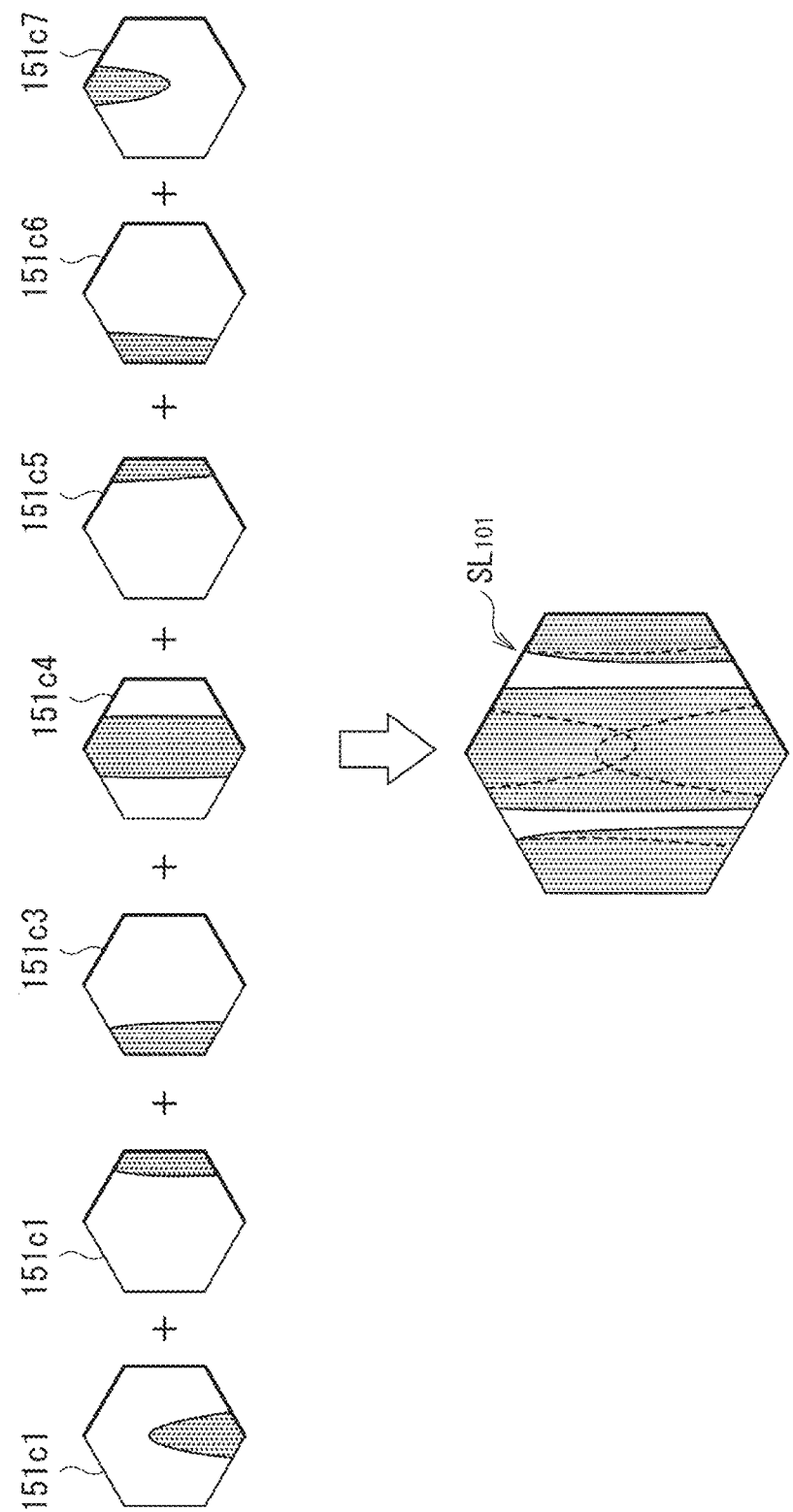
[FIG. 13]

[ FIG. 14A ]
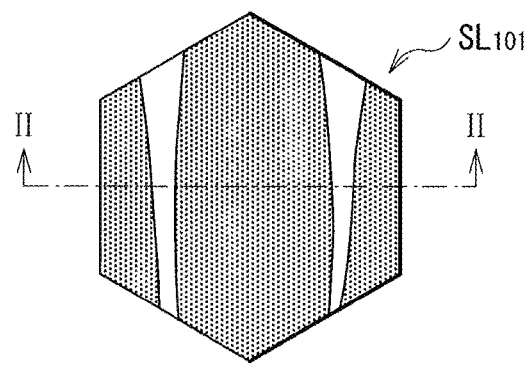
[ FIG. 14B ]
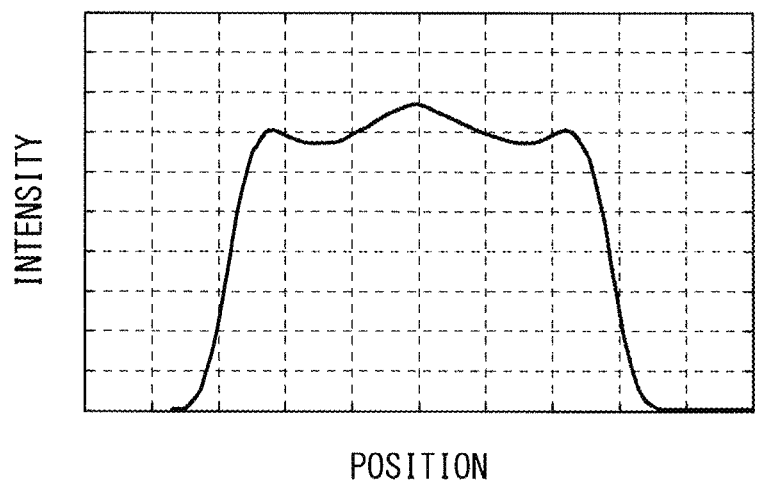

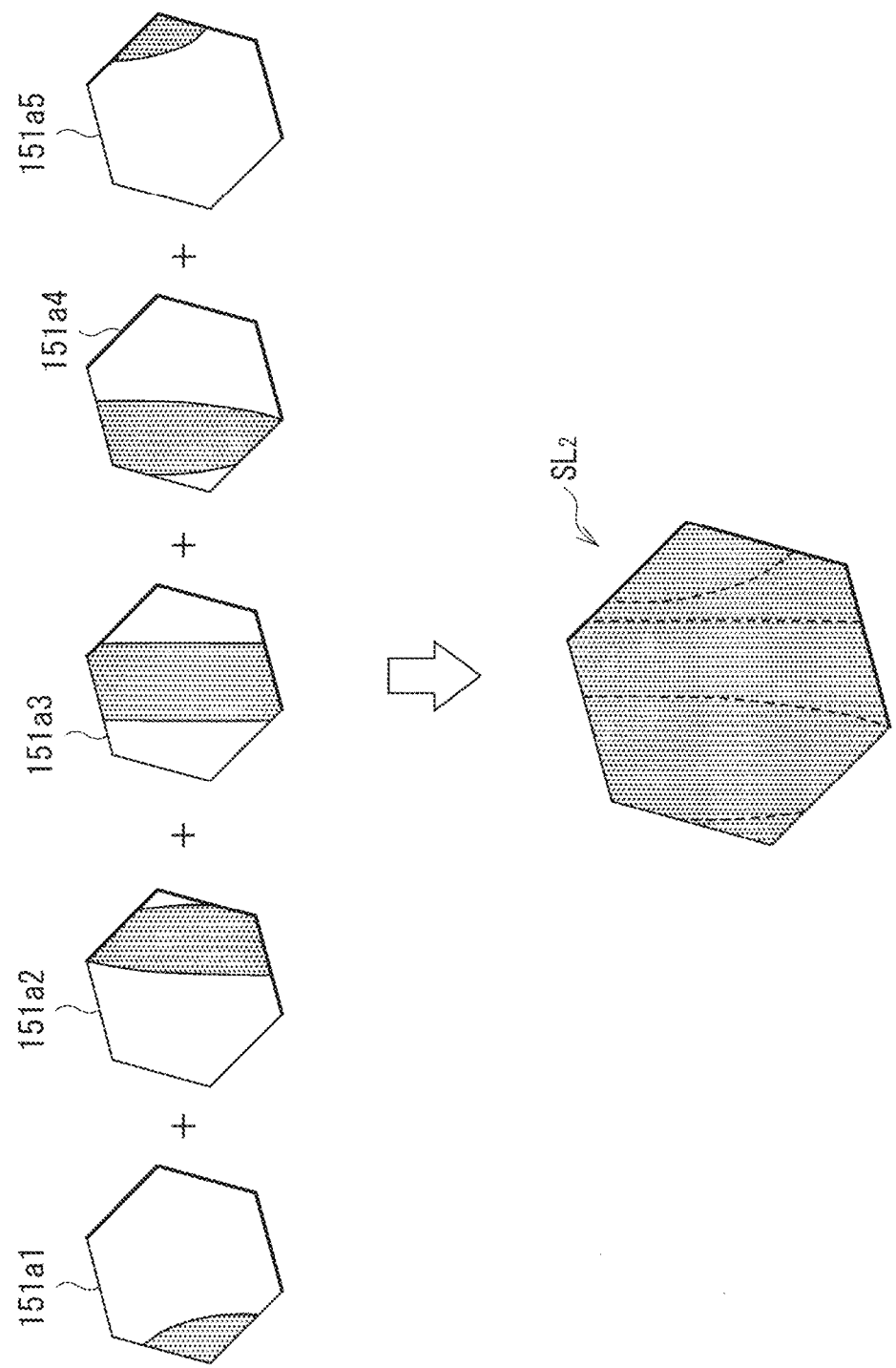

[ FIG. 16A ]
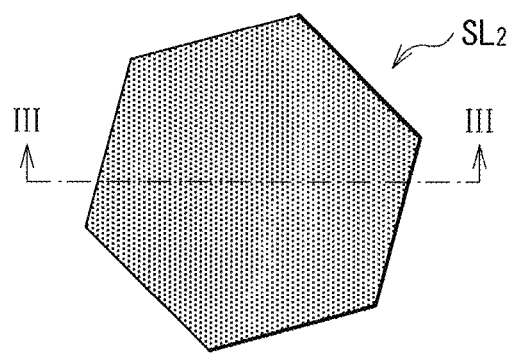
[ FIG. 16B ]
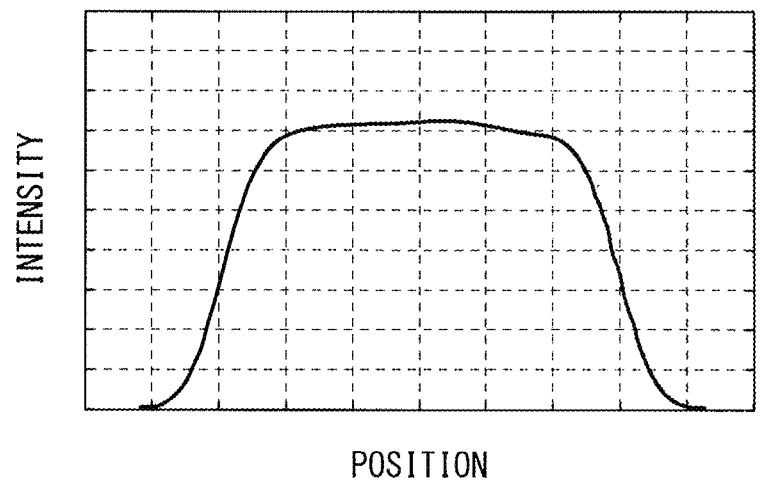

[ FIG. 17 ]
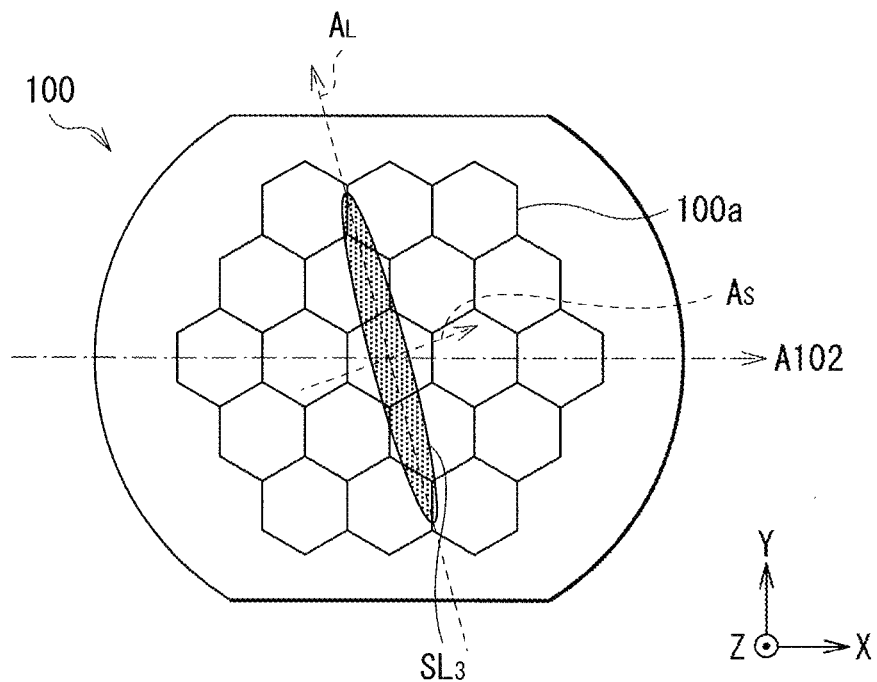
[ FIG. 18A ]
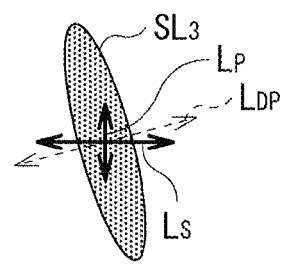
[ FIG. 18B ]
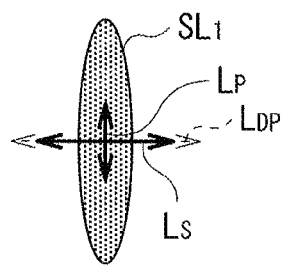

[ FIG. 19A ]
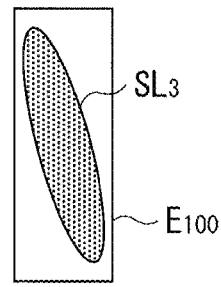
[ FIG. 19B ]
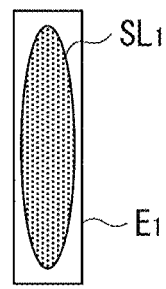
[ FIG. 20 ]
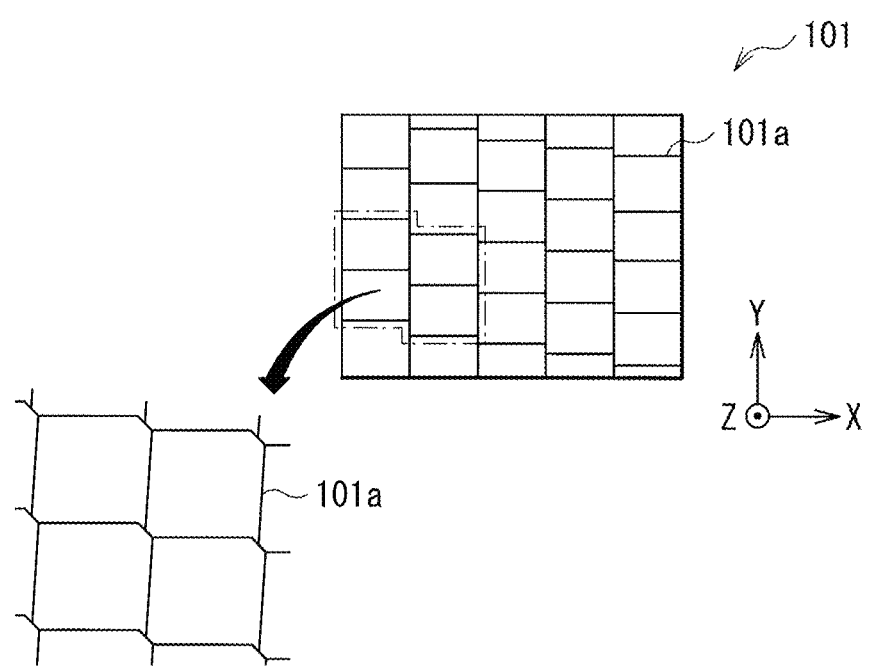

[ FIG. 21 ]
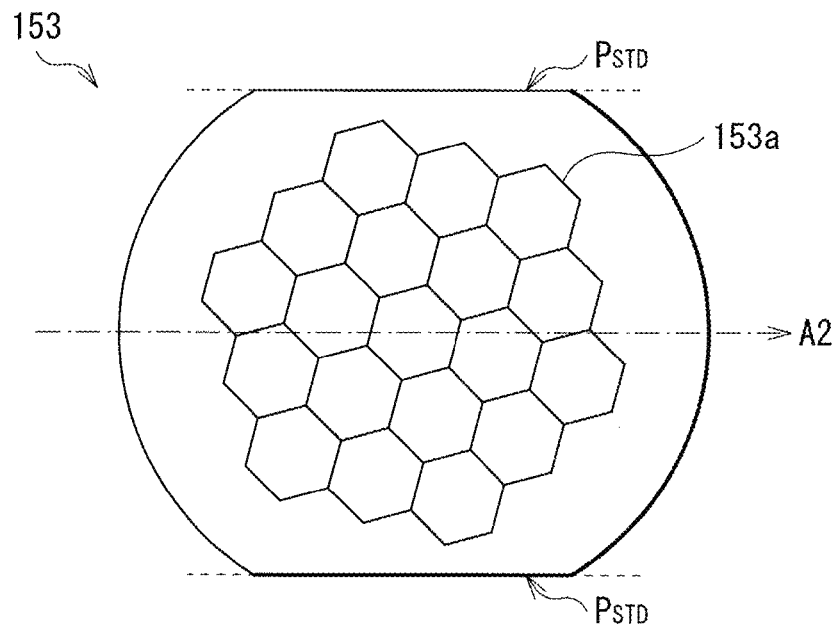
[ FIG. 22 ]
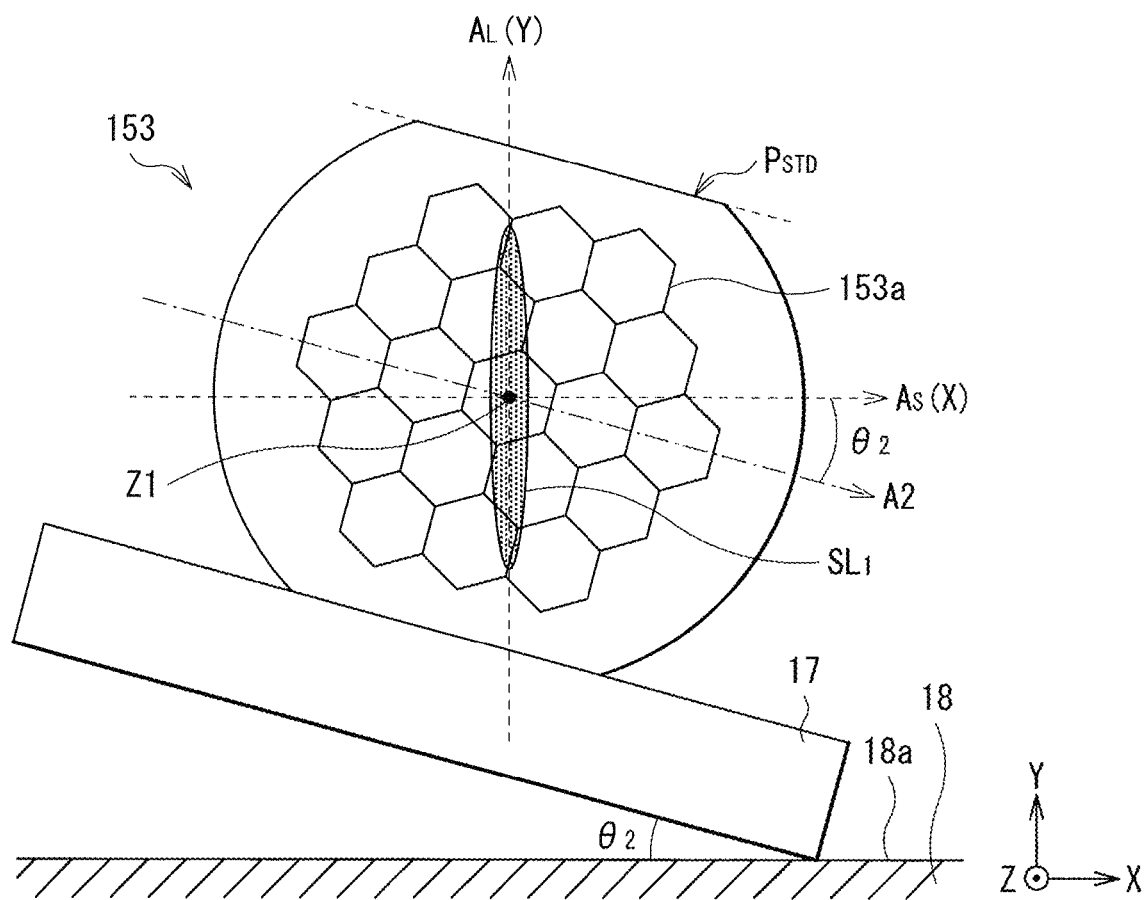

[ FIG. 23 ]
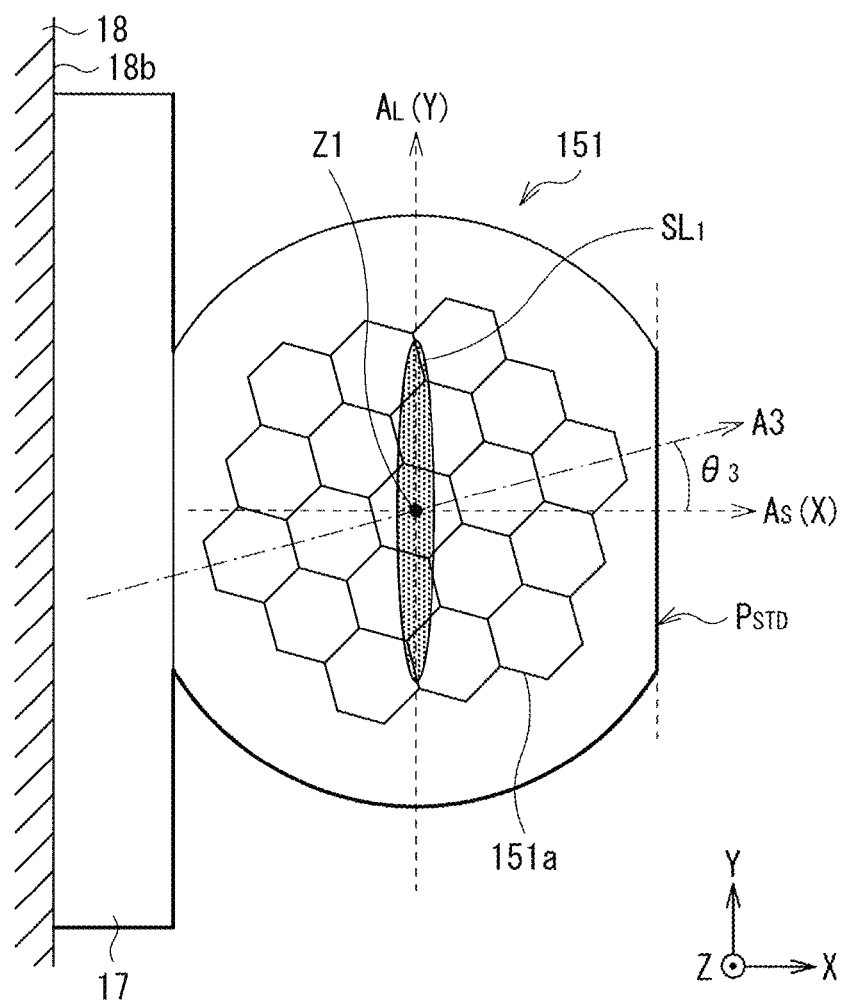

[ FIG. 24 ]
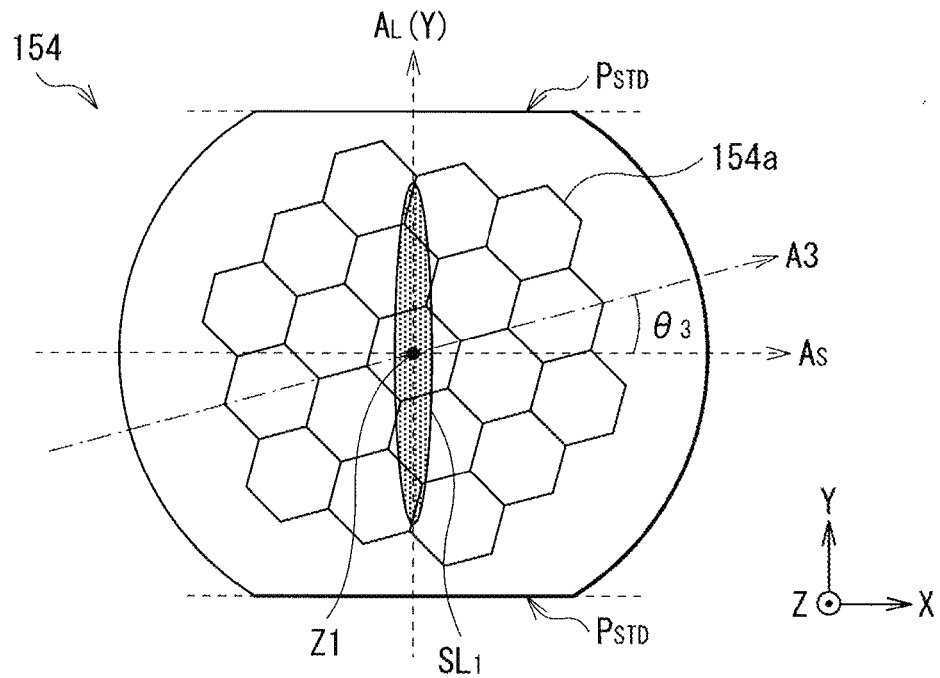
[ FIG. 25 ]
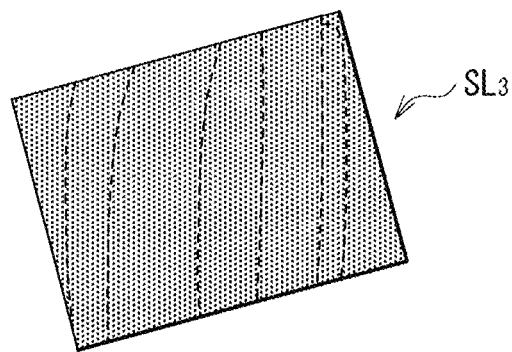

ILLUMINATION DEVICE AND DISPLAY UNIT

CROSS-REFERENCE TO RELATED APPLICATIONS

This application is a continuation of and claims the benefit under 35 U.S.C. § 120 of U.S. patent application Ser. No. 15/511,024, titled "ILLUMINATION DEVICE AND DISPLAY UNIT," filed on Mar. 14, 2017, now U.S. Pat. No. 10,146,118, which is a National Stage of International Application No. PCT/JP2015/075702, filed in the Japanese Patent Office as a Receiving office on Sep. 10, 2015, which claims priority to Japanese Patent Application Number 2014-196721, filed in the Japanese Patent Office on Sep. 26, 2014, each of which is hereby incorporated by reference in its entirety.

TECHNICAL FIELD

The present disclosure relates to an illumination device using, for example, a solid-state light-emitting element such as a laser diode (LD), and a display unit including the same.

BACKGROUND ART

In recent years, projectors that project an image on a screen have been widely used not only in offices but also at home. The projectors each modulate light from a light source by a light valve to generate image light, and thereafter project the image light on a screen to perform display (refer to PTL 1, for example). Recently, the projectors have been increasingly downsized, and palm-sized projectors, mobile phones with built-in projectors, and other projectors have started to be widespread.

CITATION LIST

Patent Literature

PTL 1: Japanese Unexamined Patent Application Publication No. 2008-134324

SUMMARY OF THE INVENTION

Incidentally, it is desirable that the above-described projectors and illumination devices used for the projectors have high uniformity of illuminance such as brightness and colors on an irradiated surface. Accordingly, in general, an integrator such as a fly-eye lens is used to reduce luminance non-uniformity of illumination light (to uniformize luminance of illumination light). However, even though the integrator is used, it may not be possible to reduce luminance non-uniformity of illumination light (it may not be possible to uniformize a luminance distribution); therefore, further improvement is desired.

It is therefore desirable to provide an illumination device that makes it possible to reduce luminance non-uniformity of illumination light, and a display unit using such an illumination device.

A first illumination device according to an embodiment of the present disclosure includes: a light source; and a uniform illumination optical system including a first fly-eye lens that includes a plurality of lenses two-dimensionally arranged and allows light based on emitted light from the light source to pass through the first fly-eye lens. Light entering the first fly-eye lens has directivity. A first reference direction in a planar shape of an illumination target region extends along a direction substantially parallel to a long-axis direction or a short-axis direction of an intensity distribution shape of the light entering the first fly-eye lens, and a periodic direction of an array of the lenses in the first fly-eye lens is inclined with respect to the long-axis direction or the short-axis direction.

A display unit according to an embodiment of the present disclosure includes an illumination optical system, a light valve, and a projection lens. The light valve modulates illumination light from the illumination optical system on the basis of an image signal to emit the thus-modulated light. The projection lens projects the light from the light valve toward a projection surface. The illumination optical system includes: a light source; and a uniform illumination optical system including a first fly-eye lens that includes a plurality of lenses two-dimensionally arranged and allows light based on emitted light from the light source to pass through the first fly-eye lens. Light entering the first fly-eye lens has directivity. A first reference direction in a planar shape of an illumination target region extends along a direction substantially parallel to a long-axis direction or a short-axis direction of an intensity distribution shape of the light entering the first fly-eye lens, and a periodic direction of an array of the lenses in the first fly-eye lens is inclined with respect to the long-axis direction or the short-axis direction.

In the first illumination device and the display unit according to the respective embodiments of the present disclosure, the light based on the emitted light from the light source passes through the uniform illumination optical system including the first fly-eye lens, and thereafter the light illuminates the illumination target region. Herein, the first reference direction in the planar shape of the illumination target region extends in the direction substantially parallel to the long-axis direction or the short-axis direction of the intensity distribution shape of the light entering the first fly-eye lens. The periodic direction of the array of the lenses in the first fly-eye lens is inclined with respect to the long-axis direction or the short-axis direction, which makes it possible to reduce non-uniformity of an intensity distribution in an illumination image after passing through the first fly-eye lens.

A second illumination device according to an embodiment of the present disclosure includes: a light source; and a uniform illumination optical system including a first fly-eye lens that includes a plurality of lenses two-dimensionally arranged and allows light based on emitted light from the light source to pass through the first fly-eye lens. Light entering the first fly-eye lens has directivity. The first fly-eye lens has an outer shape reference linearly extending along one direction in a portion of its outer edge, and is disposed to allow a periodic direction of an array of the lenses to be inclined with respect to an extending direction of the outer shape reference and to allow the extending direction of the outer shape reference to be substantially parallel to a long-axis direction or a short-axis direction of an intensity distribution shape of the light entering the first fly-eye lens.

A third illumination device according to an embodiment of the present disclosure includes: a light source; and a uniform illumination optical system including a first fly-eye lens that includes a plurality of lenses two-dimensionally arranged and allows light based on emitted light from the light source to pass through the first fly-eye lens. Light entering the first fly-eye lens has directivity. The first fly-eye lens has an outer shape reference linearly extending along one direction in a portion of its outer edge, and is disposed to allow a periodic direction of an array of the lenses to be substantially parallel or substantially orthogonal to an extending direction of the outer shape reference and to allow the extending direction of the outer shape reference to be inclined with respect to a long-axis direction or a short-axis direction of an intensity distribution shape of the light entering the first fly-eye lens.

A fourth illumination device according to an embodiment of the present disclosure includes: a light source; a uniform illumination optical system including a first fly-eye lens that includes a plurality of lenses two-dimensionally arranged and allows light based on emitted light from the light source to pass through the first fly-eye lens; and a housing that is allowed to contain the light source and the first fly-eye lens. Light entering the first fly-eye lens has directivity, and a periodic direction of an array of the lenses in the first fly-eye lens is inclined with respect to a mounting surface of the housing.

In the first to fourth illumination devices and the display unit according to the respective embodiments of the present disclosure, the periodic direction of the array of the lenses in the first fly-eye lens is inclined with respect to a predetermined direction, which makes it possible to reduce non-uniformity of the intensity distribution in the illumination image based on the light having directivity. This makes it possible to reduce luminance non-uniformity of illumination light.

It is to be noted that the above-described contents are examples of the present disclosure. Effects of the present disclosure are not limited to effects described here, and may be other effects or may further include other effects.

BRIEF DESCRIPTION OF THE DRAWINGS

FIG. 1 is a configuration diagram illustrating an overall configuration of a display unit according to a first embodiment of the present disclosure.

FIG. 2A is a cross-sectional view of an example of a configuration of each of a red laser, a green laser, and a blue laser illustrated in FIG. 1.

FIG. 2B is a cross-sectional view of an example of the configuration of each of the red laser, the green laser, and the blue laser illustrated in FIG. 1.

FIG. 3A is a cross-sectional view of another example of the configuration of each of the red laser, the green laser, and the blue laser illustrated in FIG. 1.

FIG. 3B is a cross-sectional view of another example of the configuration of each of the red laser, the green laser, and the blue laser illustrated in FIG. 1.

FIG. 3C is a cross-sectional view of another example of the configuration of each of the red laser, the green laser, and the blue laser illustrated in FIG. 1.

FIG. 4 is a schematic X-Y plan view of a configuration of a first fly-eye lens illustrated in FIG. 1.

FIG. 5 is a schematic view of an example of disposition of the first fly-eye lens illustrated in FIG. 4.

FIG. 6 is a schematic view for description of a periodic direction of an array of lenses in the first fly-eye lens.

FIG. 7 is a main-part configuration diagram for description of disposition of a light source section, the first fly-eye lens, and an illumination target region.

FIG. 8 is a schematic X-Y plan view of an intensity (luminance) distribution shape of light entering the first fly-eye lens.

FIG. 9 is a schematic X-Y plan view of a first fly-eye lens according to a comparative example 1 and an intensity distribution shape of entering light.

FIG. 10 is a schematic view for description of an intensity distribution shape after passing through the first fly-eye lens illustrated in FIG. 9.

FIG. 11A is a schematic view of an illumination image of the comparative example 1.

FIG. 11B is a characteristic diagram illustrating an intensity distribution taken along a line I-I illustrated in FIG. 11A.

FIG. 12 is a schematic X-Y plan view of a first fly-eye lens according to a comparative example 2 and an intensity distribution shape of entering light.

FIG. 13 is a schematic view for description of an intensity distribution shape after passing through the first fly-eye lens illustrated in FIG. 12.

FIG. 14A is a schematic view of an illumination image of the comparative example 2.

FIG. 14B is a characteristic diagram illustrating an intensity distribution taken along a line II-II illustrated in FIG. 14A.

FIG. 15 is a schematic view for description of an intensity distribution shape after passing through the first fly-eye lens illustrated in FIG. 4.

FIG. 16A is a schematic view of an illumination image illustrated in FIG. 15.

FIG. 16B is a characteristic diagram illustrating an intensity distribution taken along a line III-III illustrated in FIG. 16A.

FIG. 17 is a schematic X-Y plan view of a first fly-eye lens according to a comparative example 3 and an intensity distribution shape of entering light.

FIG. 18A is a schematic view for description of workings by the intensity distribution shape illustrated in FIG. 17.

FIG. 18B is a schematic view for description of workings and effects by the intensity distribution shape illustrated in FIG. 8.

FIG. 19A is a schematic view for description of an effective diameter of an optical component in a case in which the intensity distribution shape illustrated in FIG. 17 is formed.

FIG. 19B is a schematic view for description of an effective diameter of an optical component in a case in which the intensity distribution shape illustrated in FIG. 8 is formed.

FIG. 20 is a schematic X-Y plan view of a configuration of a first fly-eye lens according to a comparative example 4.

FIG. 21 is a schematic plan view of a configuration of a first fly-eye lens according to a second embodiment of the present disclosure.

FIG. 22 is a schematic X-Y plan view of the first fly-eye lens illustrated in FIG. 21 and an intensity distribution shape of entering light.

FIG. 23 is a schematic X-Y plan view of a first fly-eye lens according to a modification example 1 and an intensity distribution shape of entering light.

FIG. 24 is a schematic X-Y plan view of a first fly-eye lens according to a modification example 2 and an intensity distribution shape of entering light.

FIG. 25 is a schematic view for description of an intensity distribution shape after passing through the first fly-eye lens illustrated in FIG. 24.

MODES FOR CARRYING OUT THE INVENTION

Some embodiments of the present disclosure are described below in detail with reference to the drawings. It is to be noted that description is given in the following order.

1. First Embodiment (An example of a projection display unit that is configured so as to allow a lens array of a fly-eye lens to be inclined from a predetermined direction)
2. Second Embodiment (Another example of inclined disposition of the fly-eye lens)
3. Modification Example 1 (An example in which the fly-eye lens is disposed with respect to a vertical surface)
4. Modification Example 2 (An example in which a shape of each lens of the fly-eye lens is a rectangular shape)

First Embodiment

[Configuration]

FIG. 1 illustrates an example of an overall configuration of a display unit (a display unit) according to a first embodiment of the present disclosure. A display unit 1 may be, for example, a projector that projects an image in a magnified form onto, for example, a wall or a screen.

The display unit 1 may include, for example, an illumination optical system 10, a light valve 21, a polarizing beam splitter 23 serving as a polarization splitting element, a projection lens 24, and an illumination controller 29. It is to be noted that in the following description, a direction along an optical axis Z1 is denoted as a Z direction (a Z-axis direction), and a horizontal direction and a vertical direction in a plane orthogonal to the Z direction are respectively denoted as an X direction (an X-axis direction) and a Y direction (a Y-axis direction).

The illumination optical system 10 emits illumination light L1 to illuminate any given region (an illumination target region Sa to be described later). In the present embodiment, the illumination optical system 10 emits the illumination light L1 toward the polarizing beam splitter 23 to illuminate an effective region serving as the illumination target region Sa of the light valve 21. The illumination optical system 10 may include, as a light source section 11, for example, a blue laser 11B, a green laser 11G, a red laser 11R, a first coupling lens 12B, a second coupling lens 12G, a third coupling lens 12R, a first dichroic mirror 131, and a second dichroic mirror 132. The illumination optical system 10 may further include a drive optical element 14, a mirror 18, a first fly-eye lens 151, a second fly-eye lens 152, a first condenser lens 161, a second condenser lens 162, a third condenser lens 163, and a fourth condenser lens 164. The illumination optical system 10 corresponds to a specific example of an "illumination device" of the present disclosure.

The blue laser 11B may be, for example, a laser light source that emits blue laser light of a wavelength of about 450 nm. The green laser 11G may be, for example, a laser light source that emits green laser light of a wavelength of about 520 nm. The red laser 11R may be, for example, a laser light source that emits red laser light of a wavelength of about 640 nm. It is to be noted that a laser diode (LD) is adopted as a non-limiting example of the light source; however, for example, any of other solid-state light-emitting elements such as a light-emitting diode (LED) and an organic light-emitting diode (OLED) may be used, or a combination of two or more kinds of the solid-state light-emitting elements may be used. Emitted light from the blue laser 11B, the green laser 11G, and the red laser 11R has directivity, and a shape of an intensity distribution (an intensity distribution in a plane orthogonal to an optical axis; hereinafter simply referred to as "intensity distribution") of the emitted light is anisotropic. In the following, a case in which a laser light source is used for the light source section 11 and the shape of the intensity distribution of the emitted light, i.e., a shape of a so-called far-field pattern (FFP) is an ellipsoidal shape is described as an example. Note that technology contents to be described below are applicable widely to a light source that emits light having slight directivity (light that is not isotropic). Examples of the light source may include a light source using an LED or an LD, and a phosphor that is to be excited by emitted light from the LED or the LD, and a light source using a high-order harmonic by a nonlinear optical crystal. The shape of the intensity distribution of the emitted light is not limited to the ellipsoidal shape, and may be any other shape such as a shape having a relatively long axis direction and a relatively short axis direction (a shape that is not isotropic). Moreover, light emitted from the light source itself may not have directivity (may have an isotropic intensity distribution). It is because when the light emitted from the light source passes through any other optical member (for example, an anamorphic lens and a diffractive element) disposed between the light source and the uniform illumination optical system, the intensity distribution may become anisotropic. In other words, contents of the present disclosure are effective in a case in which an intensity distribution of light entering a fly-eye lens (herein, the first fly-eye lens 151) of a uniform illumination optical system has directivity, and the kind of the light source is not limited. However, the contents are specifically effective in a case using a light source that emits light, such as laser light, having different intensity distributions along two axis directions orthogonal to each other, and have a great merit in uniformization.

FIGS. 2A and 2B each illustrate an example of each of configurations of the blue laser 11B, the green laser 11G, and the red laser 11R. The blue laser 11B, the green laser 11G, and the red laser 11R each may include a plurality of chips 112A.

The chips 112A each may be configured of, for example, an edge-emitting laser diode that emits light of a predetermined wavelength, and may have a single light-emitting spot 112B. Wavelengths of light emitted from the plurality of chips 112A may be the same as or different from one another. For example, the plurality of chips 112A may be disposed along the X direction in an inner space enclosed with a stem 113 and a cap 114. The number of the chips 112A may be different in each of the blue laser 11B, the green laser 11G, and the red laser 11R, or may be the same in all of the blue laser 11B, the green laser 11G, and the red laser 11R.

The stem 113 may enclose the chips 112A together with the cap 114, and may include, for example, a supporting substrate 113A that supports a submount 115, an outer frame substrate 113B disposed on a back surface of the supporting substrate 113A, and a plurality of connection terminals 113C.

The submount 115 may be made of a material having conductivity and thermal dissipation. Each of the supporting substrate 113A and the outer frame substrate 113B may be configured of a base having conductivity and heat dissipation in which one or more insulating through holes and one or more conductive through holes are formed. The supporting substrate 113A and the outer frame substrate 113B each may have, for example, a disk shape, and may be stacked so as to allow central axes (not illustrated) thereof to be superimposed on each other. A diameter of the outer frame substrate 113B may be larger than a diameter of the supporting substrate 113A. An outer edge of the outer frame substrate 113B may be a ring-shaped flange hanging over in a radiation direction from the central axis of the outer frame substrate 113B in a plane having a normal along the central axis of the outer frame substrate 113B. The flange has a role in determining a reference position when the cap 114 is fit into the supporting substrate 113A in a manufacturing process.

At least one terminal (hereinafter referred to as "terminal α" for convenience sake) of the plurality of connection terminals 13C may be electrically coupled to an electrode (not illustrated) of each of the chips 112A. For example, one end of the terminal α may protrude long from the outer frame substrate 113B, and the other end of the terminal α may protrude short from the supporting substrate 113A, and may be electrically coupled to each of the chips 112A through a wire 116. Moreover, terminals (hereinafter referred to as "terminals β" for convenience sake) other than the terminals α of the plurality of connection terminals 113C may be electrically coupled to other electrodes (not illustrated) of all of the chips 112A. For example, one end of each of the terminals β may protrude long from the outer frame substrate 113B, and the other end of each of the terminals β may be embedded in the supporting substrate 113A and may be electrically coupled to all of the chips 112A through the supporting substrate 113A and the submount 115. A portion protruding long from the outer frame substrate 113 of each of the connection terminals 113C may correspond to a portion fit in, for example, a substrate. The terminals α may be supported by the insulating through holes provided in the supporting substrate 113A and the outer frame substrate 113B, and may be insulated and separated from the supporting substrate 113A and the outer frame substrate 113B by the through holes. Moreover, the respective terminals α may be insulated and separated from one another by the above-described insulating members. In contrast, the terminals β may be supported by the conductive through holes provided in the supporting substrate 113A and the outer frame substrate 113B, and may be electrically coupled to the through holes.

The cap 114 may have, for example, a cylindrical portion 114A having openings in upper and lower ends thereof. The lower end of the cylindrical portion 114A may be in contact with, for example, a side surface of the supporting substrate 113A, and the chips 112A may be disposed in an inner space of the cylindrical portion 114A. The cap 114 may have a light transmission window 114B that is disposed so as to block the opening on the upper end of the cylindrical portion 14A. The light transmission window 14B may be disposed so as to face a light emission surface of each of the plurality of chips 112A, and may have a function of allowing light outputted from each of the chips 112A to pass therethrough.

FIGS. 3A and 3B each illustrate another example of each of the configurations of the blue laser 11B, the green laser 11G, and the red laser 11R. The blue laser 11B, the green laser 11G, and the red laser 11R each may include the plurality of chips 112A as described above, or may include a single chip 112A. Moreover, one chip 112A may have a monolithic structure as illustrated in FIG. 3C, and in this case, a plurality of (herein, two) light-emitting spots 112B may be formed.

The blue laser 11B, the green laser 11G, and the red laser 11R are arranged so as to allow a long-axis direction and a short-axis direction of an intensity distribution shape (an intensity distribution shape in a plane orthogonal to the optical axis Z1) of emitted light from the light source section 11 (light based on emitted light from the blue laser 11B, emitted light from the green laser 11G, and the emitted light from the red laser 11R) to be substantially parallel or substantially orthogonal to the X-axis direction and the Y-axis direction. A case in which a long-axis direction ($A_L$) and a short-axis direction ($A_S$) of an intensity distribution shape of the emitted light from the light source section 11 (i.e., light entering the first fly-eye lens 151) are substantially parallel to the Y-axis direction and the X-axis direction, respectively, is described as an example below. Conversely, the long-axis direction ($A_L$) and the short-axis direction ($A_S$) may be substantially parallel to the X-axis direction and the Y-axis direction, respectively.

The illumination controller 29 may perform light emission control of the blue laser 11B, the green laser 11G, and the red laser 11R, for example. The illumination controller 29 may perform light emission control of each of the blue laser 11B, the green laser 11G, and the red laser 11R by a field sequential system.

The second coupling lens 12G may be a lens (a coupling lens) adapted to collimate green laser light emitted from the green laser 11G (into parallel light) to couple the thus-collimated green laser light to the first dichroic mirror 131. Similarly, the first coupling lens 12B may be a lens (a coupling lens) adapted to collimate blue laser light emitted from the blue laser 11B to couple the thus-collimated blue laser light to the first dichroic mirror 131. Moreover, the third coupling lens 12R may be a lens adapted to collimate red laser light emitted from the red laser 11R to couple the thus-collimated red laser light to the second dichroic mirror 132. It is to be noted that the coupling lenses 12R, 12G, and 12B may preferably collimate respective entering laser light (into parallel light).

The dichroic mirror 131 may be a mirror that selectively allows the blue laser light entering the dichroic mirror 131 through the first coupling lens 12B to pass therethrough and selectively reflects the green laser light entering the dichroic mirror 131 through the second coupling lens 12G. The dichroic mirror 132 may be a mirror that selectively allows the blue laser light and the green laser light outputted from the first dichroic mirror 131 to pass therethrough and selectively reflects the red laser light entering the dichroic mirror 132 through the third coupling lens 12R. Thus, color synthesis (optical path synthesis) of the red laser light, the green laser light, and the blue laser light is performed.

The drive optical element 14 may be an optical element adapted to reduce speckle noise and interference fringes in the illumination light L1, and may be disposed in an optical path between the first condenser lens 161 and the second condenser lens 162. The drive optical element 14 may minutely vibrate, for example, in a direction along the optical axis or a direction orthogonal to the optical axis to change a state of a light flux passing therethrough, which makes it possible to reduce speckle noise and interference fringes in the illumination light L1.

Each in the first fly-eye lens 151 and the second fly-eye lens 152 may be an optical member (an integrator) configured of a plurality of lenses that are two-dimensionally arranged on a substrate, and may spatially divide an entering light flux into a plurality of light fluxes in accordance with an array of the lenses to superimpose the light fluxes entering the respective lenses on one another and emit the thus-superimposed light fluxes. The first fly-eye lens 151 may be disposed in an optical path between the second dichroic mirror 132 and the first condenser lens 161. The second fly-eye lens 152 may be disposed in an optical path between the second condenser lens 162 and the third condenser lens 163. The first fly-eye lens 151 and the second fly-eye lens 152 may uniformize a light amount distribution in a plane of the illumination light. In each of the first fly-eye lens 151 and the second fly-eye lens 152, a plurality of lenses (a lens array) may be formed on both surfaces on light entry side and light exit side. Alternatively, the first fly-eye lens 151 and the second fly-eye lens 152 each may be configured of a plurality of lenses formed on one of the surfaces on the light entry side and the light exit side.

The first fly-eye lens 151 and the second fly-eye lens 152 correspond to specific examples of a "uniform illumination optical system" of the present disclosure. In the present embodiment, as described in detail later, the first fly-eye lens 151 disposed on the light source side of these fly-eye lenses is disposed so as to allow a periodic direction of a lens array to be inclined at a predetermined angle.

The mirror 18 may be disposed in an optical path between the first condenser lens 161 and the drive optical element 14. The first condenser lens 161 may be a lens adapted to condense light exiting from the first fly-eye lens 151 and allow the thus-condensed light to enter the drive optical element 14 through the mirror 18. The second condenser lens 162 may be a lens adapted to condense light exiting from the drive optical element 14 and allow the thus-condensed light to enter the second fly-eye lens 152.

The third condenser lens 163 and the fourth condenser lens 164 each may be a lens adapted to condense light exiting from the second fly-eye lens 152 and output the thus-condensed light as the illumination light L1.

The polarization beam splitter 23 may be configured of a plurality of prisms that are bonded together and each have respective surfaces coated with an optical functional film, and may be a polarization splitting element that separates light having entered the polarization splitting element into a first polarized component (for example, an S-polarized component) and a second polarized component (for example, a P-polarized component) and outputs the first polarized component and the second polarized component to different directions. The polarizing beam splitter 23 may selectively reflect, for example, the S-polarized component and may selectively allow, for example, the P-polarized component to pass therethrough. It is to be noted that any other polarization splitting element, for example, a wire grid or a polarization film may be used in place of the polarizing beam splitter 23.

The polarizing beam splitter 23 may reflect, for example, almost the entirety of the S-polarized component of the illumination light L1 having entered the polarizing beam splitter 23 to output the thus-reflected S-polarized component toward the light valve 21. The S-polarized component may be modulated (rotated) by the light valve 21 into modulated light of a P-polarized component to enter the polarizing beam splitter 23 again. The P-polarized component may pass through the polarizing beam splitter 23, and thereafter may be projected onto a projection surface 30A of a screen 30 through the projection lens 24.

The light valve 21 may be a reflective liquid crystal element such as a LCOS (Liquid Crystal On Silicon). The light valve 21 may modulate the first polarized component (for example, the S-polarized component) included in the illumination light L1 having entered the light valve 21 through the polarizing beam splitter 23 on the basis of an image signal. The light valve 21 may output the thus-modulated light toward the projection lens 24 through the polarizing beam splitter 23. The light valve 21 may output modulated light of which a polarization state is rotated from a polarization state of light entering the light valve 21. It is to be noted that the light valve 21 may return the S-polarized component entering the light valve 21 without changing its polarization state, which makes it possible to perform black display. A first reference direction in an effective region (the illumination target region Sa) of the light valve 21 extends along a direction substantially parallel to the X-axis direction or the Y-axis direction. Herein, a planar shape of the effective region of the light valve 21 is a rectangular shape, and the first reference direction is a direction along a side of the rectangular shape. More specifically, a long side and a short side of the rectangular shape are substantially parallel to the X-axis direction and the Y-axis direction, respectively.

The projection lens 24 may project the modulated light having entered from the light valve 21 through the polarizing beam splitter 23 onto the projection surface 30A of the screen 30.

(Configuration and Disposition of First Fly-Eye Lens)

FIG. 4 illustrates an X-Y planar configuration of the first fly-eye lens 151. In the first fly-eye lens 151, a plurality of lenses 151a are two-dimensionally arranged on at least one surface (for example, a light entry surface) as illustrated in the drawing. A planar shape (an X-Y planar shape) of each of the lenses 151a may be, for example, a regular hexagonal shape. The regular hexagonal lenses 151a may be laid on an X-Y plane, i.e., may be arranged in a honeycomb fashion as a whole. Such arrangement enhances an effect of superimposing entering light fluxes and facilitates uniformization of a luminance distribution of light entering the second fly-eye lens 152. However, the planar shape of each of the lenses 151a is not limited to such a regular hexagonal shape, and may be any other shape, for example, a square shape, a rectangular shape (to be described later), or a regular triangular shape. It is to be noted that the number and array of the lenses 151a illustrated in FIG. 4 are simplified for description, and are not limited to those illustrated in the drawing, and may be different from those illustrated in the drawing.

In such a first fly-eye lens 151, a periodic direction A1 of the array of the lenses 151a is inclined with respect to the X-axis direction or the Y-axis direction (for example, may be inclined at an inclination angle $\theta_{11}$ with respect to the X-axis direction). Herein, the X-axis direction and the Y-axis direction are coincident with the long-axis direction ($A_L$) and the short-axis direction ($A_S$) of the intensity distribution shape (a light source image) of emitted light from the blue laser 11B, the green laser 11G, and the red laser 11R. Moreover, the planar shape of the effective region serving as the illumination target region Sa of the light valve 21 may be a planar shape (herein, a rectangular shape) having sides (herein, a short side and a long side) extending along a direction (the first reference direction) substantially parallel to the long-axis direction $A_L$ or the short-axis direction $A_S$.

The first fly-eye lens 151 may have a linearly extending reference (an outer shape reference $P_{STD}$) in a portion of its outer edge. In the present embodiment, in a plane orthogonal to the optical axis Z1, the plurality of lenses 151a are formed so as to allow the periodic direction A1 to be inclined at a predetermined angle (the inclination angle $\theta_{11}$) with respect to an extending direction of the outer shape reference $P_{STD}$. Herein, the extending direction of the outer shape reference $P_{STD}$ is substantially parallel to the short-axis direction $A_S$ (the X-axis direction). For example, the first fly-eye lens 151 may be held so as to dispose the outer shape reference $P_{STD}$ along a holding member 17, as illustrated in FIG. 5. The first fly-eye lens 151 may be contained in a housing 18 while being held by the holding member 17. In other words, the periodic direction A1 of the lenses 151a in the first fly-eye lens 151 may be inclined with respect to a mounting surface $18_a$ of the housing 18. The holding member 17 may hold the first fly-eye lens 151 only, or may be allowed to hold a plurality of optical components including the first fly-eye lens 151 that are arranged along an optical axis direction.

In the following, description is given of the periodic direction A1 of the lenses 151a. The periodic direction A1 of the array of the lenses 151a is denoted as a direction where an interval between adjacent lenses 151a is minimum. In a case in which the planar shape of each of the lenses 151a is a regular hexagonal shape, three periodic directions A11, A12, and A13 in total are present, as illustrated in FIG. 6. In a case in which a plurality of periodic directions are present in such a manner, a periodic direction forming a minimum angle with the X-axis direction (the short-axis direction $A_S$) or the Y-axis direction (the long-axis direction $A_L$) is denoted as the "periodic direction A1". Herein, for example, $\theta_{11} \leq \theta_{12} \leq \theta_{13}$ may be established, and the periodic direction A11 forming the minimum angle with the X-axis direction out of the periodic directions A11, A12, and A13 may be set as the periodic direction A1.

FIG. 7 illustrates a disposition example in the display unit 1. However, in FIG. 7, only a main part of the display unit 1 is illustrated, and some optical components are omitted for simplification. The light source section 11, the first fly-eye lens 151, and the light valve 21 serving as an illumination target may be disposed along the optical axis Z1 as illustrated in the drawing.

Light based on emitted light (combined light) from the blue laser 11B, the green laser 11G, and the red laser 11R may show, for example, an ellipsoidal intensity (luminance) distribution shape $SL_1$ (may form an ellipsoidal far field pattern (FFP)) on the light entry surface in the first fly-eye lens 151. For example, the short-axis direction $A_S$ and the long-axis direction $A_L$ of the intensity distribution shape $SL_1$ may be substantially parallel to the X-axis direction and the Y-axis direction, respectively. More specifically, the blue laser 11B, the green laser 11G, and the red laser 11R may be disposed on the optical axis so as to allow the short-axis direction $A_S$ and the long-axis direction $A_L$ of the intensity distribution shape $SL_1$ to be substantially parallel to the X-axis direction and the Y-axis direction, respectively.

In contrast, the light valve 21 may have a rectangular effective region as the illumination target region Sa. The light valve 21 may be disposed on the optical axis so as to allow a long side and a short side of the rectangular shape of the effective region to be substantially parallel to the X-axis direction and the Y-axis direction, respectively.

Meanwhile, the first fly-eye lens 151 may be disposed so as to allow the periodic direction A1 of the array of the lenses 151a to be inclined with respect to the short-axis direction $A_S$ (the X-axis direction), as described above. In the present embodiment, the long-axis direction $A_L$ and the short-axis direction $A_S$ of the intensity distribution shape $SL_1$ of the emitted light from the light source section 11 (the light entering the first fly-eye lens 151) are substantially parallel to the short side and the long side of the illumination target region Sa in such a manner. In contrast, the periodic direction A1 in the first fly-eye lens 151 may be inclined with respect to the long-axis direction $A_L$ or the short-axis direction $A_S$. More specifically, out of the light source section 11, the first fly-eye lens 151, and the light valve 21, only a two-dimensional array of the lenses 151a in the first fly-eye lens 151 may be rotated about the optical axis Z1 by a predetermined angle (the inclination angle $\theta_{11}$).

Herein, in a case in which the planar shape of each of the lenses 151a is a regular hexagonal shape, the inclination angle $\theta_{11}$ may be desirably, for example, greater than 0 degrees and smaller than 30 degrees, and more specifically 15 degrees. In a case in which the inclination angle $\theta_{11}$ is 15 degrees, it is possible to maximize a light superimposition effect (superimposing effect) by the first fly-eye lens 151, thereby effectively reducing non-uniformity of an in-plane intensity distribution (in-plane illuminance distribution) in the illumination light L1.

[Workings and Effects]

In the display unit 1, the in-plane intensity distribution of the emitted light (laser light) from the light source section 11 is uniformized by the uniform illumination optical system (the first fly-eye lens 151 and the second fly-eye lens 152), and the emitted light is outputted as the illumination light L1 from the illumination optical system 10. A portion (for example, the S-polarized component) of the illumination light L1 enters the light valve 21 through the polarizing beam splitter 23, and is modulated by the light valve 21 on the basis of an image signal inputted from an external device. The thus-modulated light is outputted as, for example, the P-polarized component from the light valve 21, and thereafter enters the projection lens 24 through the polarizing beam splitter 23. Thus, an image is displayed on the projection surface 30A of the screen 30 by the projection lens 24. In the display unit 1, an image is displayed in such a manner.

Herein, in the present embodiment, it is characterized that the periodic direction A1 of the lenses 151a in the first fly-eye lens 151 is inclined with respect to the long-axis direction $A_S$ or the short-axis direction $A_S$. More specifically, the first fly-eye lens 151 is configured so as to allow the periodic direction A1 of the lenses 151a to be inclined with respect to the extending direction of the outer shape reference $P_{STD}$. In contrast, the long-axis direction $A_L$ and the short-axis direction $A_S$ of the intensity distribution shape $SL_1$ of the light entering the first fly-eye lens 151 are substantially parallel to the short side and the long side of the rectangular shape of the light valve 21. Accordingly, the intensity distribution shape $SL_1$ formed on the light entry surface of the first fly-eye lens 151 is formed over a plurality of selective lenses 151a (lenses 151a1, 151a2, 151a3, 151a4, and 151a5), as illustrated in FIG. 8.

COMPARATIVE EXAMPLES

FIG. 9 schematically illustrates a configuration example of a first fly-eye lens according to a comparative example 1 of the present embodiment together with the intensity distribution shape $SL_1$. In the comparative example 1, unlike the present embodiment, a periodic direction A100 of an array of lenses 151b in the first fly-eye lens is substantially parallel to the long-axis direction $A_L$ of the intensity distribution shape $SL_1$. In other words, an inclination angle of the periodic direction A100 with respect to the long-axis direction $A_L$ of the intensity distribution shape $SL_1$ is 0 degrees. It is to be noted that an inclination angle of the periodic direction A100 with respect to the short-axis direction $A_S$ is 30 degrees.

In the first fly-eye lens of the comparative example 1, the intensity distribution shape $SL_1$ is formed over a plurality of selective lenses 151b (lenses 151b1 to 151b5). Accordingly, as schematically illustrated in FIG. 10, an intensity distribution shape (an illumination image $SL_{100}$) of light having passed through the first fly-eye lens corresponds to superimposition of light fluxes having entered the respective lenses 151b1 to 151b5. As a result, in the comparative example 1, an intensity distribution in the illumination image $SL_{100}$ is biased to a local portion (for example, a portion around a center) in a plane. Moreover, as can be seen from a cross-section taken along an arrow line I-I of FIG. 11A, the illumination image $SL_{100}$ has a non-uniform distribution as illustrated in FIG. 11B. Accordingly, in a case in which the inclination angle with respect to the long-axis direction $A_L$ of the intensity distribution shape $SL_1$ is 0 degrees, a superimposition effect by the first fly-eye lens is not sufficient.

FIG. 12 schematically illustrates a first fly-eye lens according to a comparative example 2 of the present embodiment together with the intensity distribution shape $SL_1$. In the comparative example 2, unlike the present embodiment, a periodic direction A101 of an array of lenses 151c in the first fly-eye lens is substantially parallel to the short-axis direction $A_S$ of the intensity distribution shape $SL_1$. In other words, an inclination angle of the periodic direction A101 with respect to the short-axis direction $A_S$ of the intensity distribution shape $SL_1$ is 0 degrees (an inclination angle of the periodic direction A101 with respect to the long-axis direction $A_L$ is 30 degrees).

In the first fly-eye lens of the comparative example 2, the intensity distribution shape $SL_1$ is formed over a plurality of selected lenses 151c (lenses 151c1 to 151c7). Accordingly, as schematically illustrated in FIG. 13, an intensity distribution shape (an illumination image $SL_{101}$) of light having passed through the first fly-eye lens corresponds to superimposition of light fluxes having entered the respective lenses 151c1 to 151c7. As a result, in the comparative example 2, an intensity distribution in the illumination image $SL_{101}$ is biased to a local portion in a plane. Moreover, as can be seen from a cross-section taken along an arrow line II-II of FIG. 14A, the illumination image $SL_{101}$ has a non-uniform distribution as illustrated in FIG. 14B. Accordingly, even in a case in which the inclination angle with respect to the short-axis direction $A_S$ of the intensity distribution shape $SL_1$ is 0 degrees, a superimposition effect by the first fly-eye lens is not sufficient.

In contrast, in the present embodiment, as schematically illustrated in FIG. 15, an intensity distribution shape (an illumination image $SL_2$) of light having passed through the first fly-eye lens 151 corresponds to superimposition of light fluxes having entered the respective lenses 151a1 to 151a5 in FIG. 8. As a result, in the present embodiment, unlike the comparative examples 1 and 2, an intensity distribution in the illumination image $SL_2$ is less likely to be biased, thereby reducing intensity non-uniformity (illuminance non-uniformity). Moreover, as can be seen from a cross-section taken along an arrow line III-III of FIG. 16A, the illumination image $SL_2$ has a substantially uniform distribution as illustrated in FIG. 16B. It is to be noted that this distribution is a distribution in a case in which the inclination angle $\theta_{11}$ is 15 degrees.

As described above, inclining the periodic direction A1 of the lenses 151a in the first fly-eye lens 151 from a predetermined direction makes it possible to reduce non-uniformity of the intensity distribution in the illumination light L1 even in a case in which the emitted light from the light source section 11 is light having directivity, for example, laser light.

(Merits by Inclined Disposition of Lens)

Here, FIG. 17 illustrates, as a comparative example 3 of the present embodiment, an X-Y planar configuration of a first fly-eye lens 100 and an intensity distribution shape $SL_3$ of emitted light from the light source section 11 (light entering the first fly-eye lens 100). As illustrated in the drawing, in the comparative example 3, while a periodic direction A102 of an array of lenses 100a in the first fly-eye lens 100 is substantially parallel to the X-axis direction, the long-axis direction $A_L$ and the short-axis direction $A_S$ of the intensity distribution shape $SL_3$ are inclined from the X-axis direction and the Y-axis direction. Such disposition in this comparative example is achievable by disposing respective laser light sources (the blue laser 11B, the green laser 11G, and the red laser 11R) in the light source section 11 in a state in which the respective laser light sources are rotated around the optical axis. Even in the comparative example 3, a superimposition effect similar to that in the present embodiment is achievable. In other words, when the periodic direction of a lens array is relatively inclined with respect to the long-axis direction or the short-axis direction of the intensity distribution shape of light entering the first fly-eye lens, the above-described superimposition effect is achievable, thereby allowing for reduction in non-uniformity of the intensity distribution in the illumination image.

However, in a case in which the respective laser sources of the light source section 11 are disposed so as to be rotated around the optical axis, for example, as illustrated in FIG. 18A, a polarization direction $L_{DP}$ of each of the laser light sources in the intensity distribution shape $SL_3$ may not be coincident with, for example, the S-polarized component, and reflected light (the S-polarized component) by the polarizing beam splitter 23 may be slightly mixed with the P-polarized component. Namely, a ratio of polarized light entering the polarizing beam splitter 23 is worsened. As a result, a contrast ratio in display image quality declines.

In contrast, in a case in which the periodic direction A1 of the lenses 151a in the first fly-eye lens 151 is inclined without changing the positions of the respective laser light sources of the light source section 11 as with the present embodiment, for example, as illustrated in FIG. 18B, in the intensity distribution shape $SL_1$, the polarization direction $L_{DP}$ of each of the laser light sources may be coincident with, for example, the S-polarized component, and the P-polarized component may be less likely to enter the polarization beam splitter 23. Namely, a ratio of polarized light entering the polarizing beam splitter 23 is improved, which makes it possible to achieve a favorable contrast ratio in display image quality.

Moreover, in the above-described comparative example 3, the laser light sources themselves are rotated, and the intensity distribution shape $SL_3$ of emitted light from the light source section 11 is inclined from the X-axis direction and the Y-axis direction; therefore, for example, an optical effective region (an effective diameter) E100 for securing of a projection area of the intensity distribution shape $SL_3$ may tend to become relatively large, as illustrated in FIG. 19A. As a result, a size of an optical component (for example, an optical path synthesizing component) is increased.

In contrast, in the present embodiment, owing to inclined disposition of the lenses 151a, it is not necessary to rotate the laser light sources themselves. Accordingly, for example, an optical effective region (an effective diameter) E1 for securing of a projection area of the intensity distribution shape $SL_1$ may become relatively small, as illustrated in FIG. 19B. As a result, it is possible to reduce the size of the optical component (for example, the optical synthesizing component), which is advantageous in size reduction in an optical system.

It is to be noted that, in order to achieve the above-described superimposition effect, for example, a first fly-eye lens 101 of a comparative example 4 illustrated in FIG. 20 may be used. In the first fly-eye lens 101, the positions of lenses 101a are shifted on a row-by-row basis or a column-by-column basis along the Y-axis direction or the X-axis direction (herein, on the column-by-column basis along the Y-axis direction). However, it is extremely difficult to manufacture the first fly-eye lens 101 having such a lens array. More specifically, it may be possible to manufacture the first fly-eye lens 101 by, for example, injection molding, and a mold used for the injection molding is manufactured as follows. A plurality of (for five columns) molds of a lens array corresponding to one column along the Y direction in FIG. 20 may be fabricated by, for example, cutting, and thereafter, the molds for five columns may be aligned and combined to form a mold for the first fly-eye lens 101 having a configuration illustrated in FIG. 20. Therefore, fabrication of the mold involves cost, and it is difficult to achieve accuracy. An alternative technique is forming molds collectively (at a time), but in this case, a planar shape of each of the lenses 101a is not formed in a perfect rectangular shape (an enlarged view of a portion indicated by an alternate long and short dashed line in FIG. 20).

As described above, in the present embodiment, the periodic direction A1 of the array of the lenses 151a in the first fly-eye lens 151 is inclined with respect to the long-axis direction $A_L$ or the short-axis direction $A_S$ of the intensity distribution shape $SL_1$, which makes it possible to reduce non-uniformity of the intensity distribution in the illumination image based on light having directivity. Accordingly, it is possible to reduce luminance non-uniformity of illumination light.

In the following, description is given of other embodiments of the present disclosure and modification examples thereof. It is to be noted that substantially same components as the components of the foregoing first embodiment are denoted by same reference numerals, and any redundant description thereof is omitted.

Second Embodiment

FIG. 21 illustrates a configuration of a first fly-eye lens (a first fly-eye lens 153) according to a second embodiment of the present disclosure. In the foregoing first embodiment, description has been given of a case in which the periodic direction A1 of the lenses 151a in the first fly-eye lens 151 is inclined with respect to the extending direction (the X-axis direction) of the outer shape reference $P_{STD}$; however, it may not be necessary to incline the periodic direction of the lenses with respect to the extending direction of the outer shape reference $P_{STD}$. More specifically, as with the first fly-eye lens 153 illustrated in FIG. 21, a periodic direction A2 of an array of lenses 153a may be substantially parallel or substantially orthogonal (herein, substantially parallel) to the extending direction of the outer shape reference $P_{STD}$.

Note that, in the present embodiment, unlike the foregoing first embodiment, for example, the first fly-eye lens 153 may be disposed so as to be inclined at a predetermined angle (an inclination angle $\theta_2$) from the short-axis direction $A_S$ (the X-axis direction) by the holding member 17, as illustrated in FIG. 22. It is to be noted that, in the present embodiment, the configuration and disposition of the first fly-eye lens 153 is different from those in the foregoing first embodiment, and configurations and disposition of other optical components including the light source section 11 and the light valve 21 are similar to those in the foregoing first embodiment. In other words, even in the present embodiment, the long-axis direction $A_L$ and the short-axis direction $A_S$ of the intensity distribution shape $SL_1$ of light entering the first fly-eye lens 153 (emitted light from the light source section 11) are coincident with the X-axis direction or the Y-axis direction. Moreover, the long-axis direction $A_L$ and the short-axis direction $A_S$ are substantially parallel to the short side and the long side of the effective region serving as the illumination target region Sa of the light valve 21, respectively.

With such disposition, the periodic direction A2 of the lenses 153a may be inclined with respect to the long-axis direction $A_L$ and the short-axis direction $A_S$. In other words, the periodic direction A2 of the lenses 153a in the first fly-eye lens 153 may be inclined with respect to the mounting surface $18_a$ of the housing 18. Moreover, as with the inclination angle $\theta_{11}$ in the foregoing first embodiment, in a case in which the planar shape of each of the lenses 153a is a regular hexagonal shape, the inclination angle $\theta_2$ may be desirably, for example, greater than 0 degrees and smaller than 30 degrees, and more specifically 15 degrees.

In the present embodiment, the periodic direction A2 of the array of the lenses 153a in the first fly-eye lens 153 is substantially parallel or substantially orthogonal to the extending direction of the outer shape reference $P_{STD}$, and the extending direction of the outer shape reference $P_{STD}$ is inclined with respect to the long-axis direction $A_L$ or the short-axis direction $A_S$ in the intensity distribution shape $SL_1$. Accordingly, as with the foregoing first embodiment, a superimposition effect by the first fly-eye lens 153 is effectively achieved, which makes it possible to achieve effects similar to those in the foregoing first embodiment.

Modification Example 1

FIG. 23 is a schematic view of a disposition example of a first fly-eye lens according to a modification example 1. The foregoing first embodiment involves an example in which the first fly-eye lens 151 is disposed on a horizontal plane (an X-Z plane) so as to dispose the extending direction of the outer shape reference $P_{STD}$ along the X-axis direction; however, as with the present modification example, the first fly-eye lens 151 may be disposed on a vertical plane (a Y-Z plane) so as to dispose the extending direction of the outer shape reference $P_{STD}$ along the Y-axis direction. Moreover, in the present modification example, a periodic direction A3 of the lenses 151a in the first fly-eye lens 151 may be inclined at a predetermined angle (an inclination angle $\theta_3$) with respect to the short-axis direction $A_S$ (the X-axis direction), and may be substantially orthogonal to the short-axis direction $A_S$ and the extending direction of the outer shape reference $P_{STD}$. As with the inclination angle $\theta_{11}$ in the foregoing first embodiment, in a case in which a planar shape of each of the lenses 153a is a regular hexagonal shape, the inclination angle $\theta_3$ may be desirably, for example, greater than 0 degrees and smaller than 30 degrees, and more specifically 15 degrees.

Even in the present modification example, the periodic direction A3 in the first fly-eye lens 151 is inclined with respect to the long-axis direction $A_L$ or the short-axis direction $A_S$ of the intensity distribution shape $SL_1$, which makes it possible to achieve effects similar to those in the foregoing first embodiment.

Modification Example 2

FIG. 24 is a schematic X-Y plan view of a first fly-eye lens (a first fly-eye lens 154) according to a modification example 2 and an intensity distribution shape of entering light. As with the foregoing first embodiment, the first fly-eye lens 154 of the present modification example may include a plurality of lenses 154a that are two-dimensionally arranged on at least one surface of a substrate. Moreover, the periodic direction A3 of the lenses 154a may be inclined with respect to the long-axis direction $A_L$ or the short-axis direction $A_S$. However, in the present modification example, a planar shape of each of the lenses 154a is a rectangular shape. Even in this case, as schematically illustrated in FIG. 25, it is possible to reduce luminance non-uniformity in an intensity distribution shape $SL_3$ of light having passed through the first fly-eye lens 154 (after superimposing light fluxes). As described above, the planar shape of each of the lenses 154a in the first fly-eye lens 154 may be a rectangular shape.

Although description has been made by giving the embodiments and the modification examples thereof, the present disclosure is not limited thereto and may be modified in a variety of ways. For example, in the foregoing embodiments and examples, as the first fly-eye lens, a fly-eye lens having a predetermined outer shape reference in its outer edge is exemplified; however, the first fly-eye lens may not have such an outer shape reference. As long as the periodic direction of an array of lenses is inclined with respect to the long-axis direction or the short-axis direction of the intensity distribution shape of emitted light from the light source section, effects of the present disclosure are achievable.

Moreover, in the foregoing embodiments and examples, as the illumination target region of the illumination optical system (an illumination device), the effective region of the light valve is exemplified; however, the illumination target region is not limited thereto, and any of various regions may be set as the illumination target region. Further, the planar shape of the illumination target region is not limited to the above-described rectangular shape. Any shape having a side or an axis (a long axis or a short axis) along a direction (the first reference direction) extending along the long-axis direction or the short-axis direction may be adopted. For example, a square shape or any other polygonal shape may be adopted, or a shape not having a straight line such as an ellipsoidal shape and a circular shape may be adopted.

Furthermore, in the foregoing embodiments and examples, a case in which the light valve 21 is configured of a reflective liquid crystal display element has been described; however, the light valve 21 is not limited thereto, and may be configured of, for example, a digital micromirror device (DMD).

In addition, in the foregoing embodiments and examples, respective components (optical systems) of the illumination optical system and the display unit have been specifically described. However, all of the components are not necessarily provided, and other components may be further provided.

Moreover, in the foregoing embodiments and examples, as application of the illumination device of the present disclosure, the display unit such as the projection display unit has been described as an example; however, the application is not limited thereto, and the illumination device of the present disclosure is applicable to an exposure apparatus such as a stepper, for example.

It is to be noted that effects described in the foregoing embodiments and examples are merely exemplified, and effects of the present disclosure may be other effects or may further include other effects.

Moreover, the present disclosure may adopt the following configurations.

(1)

An illumination device, including:

a light source; and a uniform illumination optical system including a first fly-eye lens that includes a plurality of lenses two-dimensionally arranged and allows light based on emitted light from the light source to pass through the first fly-eye lens, wherein light entering the first fly-eye lens has directivity, a first reference direction in a planar shape of an illumination target region extends along a direction substantially parallel to a long-axis direction or a short-axis direction of an intensity distribution shape of the light entering the first fly-eye lens, and a periodic direction of an array of the lenses in the first fly-eye lens is inclined with respect to the long-axis direction or the short-axis direction.

(2)

The illumination device according to (1), wherein the first fly-eye lens has an outer shape reference linearly extending along one direction in a portion of its outer edge.

(3)

The illumination device according to (2), wherein the first fly-eye lens is disposed to allow a periodic direction of the lenses to be inclined with respect to an extending direction of the outer shape reference and to allow the extending direction of the outer shape reference to be substantially parallel to the long-axis direction or the short-axis direction.

(4)

The illumination device according to (2), wherein the first fly-eye lens is disposed to allow a periodic direction of the lenses to be substantially parallel or substantially orthogonal to an extending direction of the outer shape reference and to allow the extending direction of the outer shape reference to be inclined with respect to the long-axis direction or the short-axis direction.

(5)

The illumination device according to any one of (1) to (4), further including a second fly-eye lens in an optical path between the light source and the light valve, wherein the first fly-eye lens is disposed closer to the light source than the second fly-eye lens.

(6)

The illumination device according to any one of (1) to (5), wherein the first fly-eye lens includes the plurality of lenses on one of light entry side and light exit side or both, and when the plurality of lenses are included on the light entry side, a periodic direction of the lenses on the light entry side is inclined with respect to the long-axis direction or the short-axis direction.

(7)

The illumination device according to any one of (1) to (6), further including a housing that is allowed to contain the light source and the first fly-eye lens, wherein a periodic direction of the lenses in the first fly-eye lens is inclined with respect to a mounting surface of the housing.

(8)

The illumination device according to any one of (1) to (7), wherein the plurality of lenses in the first fly-eye lens each have a regular hexagonal planar shape in a plane where the lenses are disposed, and are arranged in a honeycomb fashion as a whole.

(9)

The illumination device according to (8), wherein an inclination angle between a periodic direction of the lenses in the first fly-eye lens and the long-axis direction or the short-axis direction is greater than 0 degrees and smaller than 30 degrees.

(10)

The illumination device according to (9), wherein the inclination angle is 15 degrees.

(11)

The illumination device according to any one of (1) to (10), wherein the light source includes one or more laser diodes that emit light of a same wavelength or a different wavelength.

(12)

The illumination device according to any one of (1) to (11), wherein the planar shape of the illumination target region is a rectangular shape, and the first reference direction is a direction along a side of the rectangular shape.

(13)

An illumination device, including:
a light source; and
a uniform illumination optical system including a first fly-eye lens that includes a plurality of lenses two-dimensionally arranged and allows light based on emitted light from the light source to pass through the first fly-eye lens, wherein
light entering the first fly-eye lens has directivity, and
the first fly-eye lens has an outer shape reference linearly extending along one direction in a portion of its outer edge, and is disposed to allow a periodic direction of an array of the lenses to be inclined with respect to an extending direction of the outer shape reference and to allow the extending direction of the outer shape reference to be substantially parallel to a long-axis direction or a short-axis direction of an intensity distribution shape of the light entering the first fly-eye lens.

(14)

An illumination device, including:
a light source; and
a uniform illumination optical system including a first fly-eye lens that includes a plurality of lenses two-dimensionally arranged and allows light based on emitted light from the light source to pass through the first fly-eye lens, wherein
light entering the first fly-eye lens has directivity, and
the first fly-eye lens has an outer shape reference linearly extending along one direction in a portion of its outer edge, and is disposed to allow a periodic direction of an array of the lenses to be substantially parallel or substantially orthogonal to an extending direction of the outer shape reference and to allow the extending direction of the outer shape reference to be inclined with respect to a long-axis direction or a short-axis direction of an intensity distribution shape of the light entering the first fly-eye lens.

(15)

An illumination device, including:
a light source;
a uniform illumination optical system including a first fly-eye lens that includes a plurality of lenses two-dimensionally arranged and allows light based on emitted light from the light source to pass through the first fly-eye lens; and
a housing that is allowed to contain the light source and the first fly-eye lens, wherein
light entering the first fly-eye lens has directivity, and
a periodic direction of an array of the lenses in the first fly-eye lens is inclined with respect to a mounting surface of the housing.

(16)

A display unit provided with an illumination optical system, a light valve, and a projection lens, the light valve that modulates illumination light from the illumination optical system on a basis of an image signal to emit the thus-modulated light, the projection lens that projects the light from the light valve toward a projection surface, the illumination optical system including:
a light source; and
a uniform illumination optical system including a first fly-eye lens that includes a plurality of lenses two-dimensionally arranged and allows light based on emitted light from the light source to pass through the first fly-eye lens, wherein
light entering the first fly-eye lens has directivity,
a first reference direction in a planar shape of an illumination target region extends along a direction substantially parallel to a long-axis direction or a short-axis direction of an intensity distribution shape of the light entering the first fly-eye lens, and
a periodic direction of an array of the lenses in the first fly-eye lens is inclined with respect to the long-axis direction or the short-axis direction.

(17)

The display unit according to (16), wherein the illumination target region is an effective region of the light valve.

(18)

The display unit according to (17), wherein
a planar shape of the effective region is a rectangular shape, and
the first reference direction is a direction along a side of the rectangular shape.

The present application is based on and claims priority from Japanese Patent Application No. 2014-196721 filed in the Japan Patent Office on Sep. 26, 2014, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. An illumination device, comprising:
a light source; and
an optical system configured to include one fly-eye lens that includes a plurality of lenses, wherein
a first reference direction in a planar shape of an illumination target region extends along a direction substantially parallel to a long-axis direction or a short-axis direction of an intensity distribution shape of the light entering the one fly-eye lens,
the intensity distribution shape of the light entering the one fly-eye lens is elongated in the long-axis direction,
a periodic direction of an array of the lenses in the one fly-eye lens is inclined with respect to the long-axis direction or the short-axis direction, wherein the one fly-eye lens has an outer shape reference linearly extending along one direction in a portion of its outer edge,
the plurality of lenses in the one fly-eye lens each have a regular hexagonal planar shape in a plane where the lenses are disposed, and are arranged in a honeycomb pattern as a whole,
the periodic direction of the hexagonal shape lenses in the honeycomb pattern is inclined with respect to the long-axis direction or the short-axis direction without shifting of the hexagonal shape lenses in the honeycomb pattern, and
an inclination angle between a periodic direction of the lenses in the one fly-eye lens and the long-axis direction or the short-axis direction is greater than 0 degrees and smaller than 30 degrees.

2. The illumination device according to claim 1, wherein the one fly-eye lens is disposed to allow a periodic direction of the lenses to be inclined with respect to an extending direction of the outer shape reference and to allow the extending direction of the outer shape reference to be substantially parallel to the long-axis direction or the short-axis direction.

3. The illumination device according to claim 1, wherein the one fly-eye lens is disposed to allow a periodic direction of the lenses to be substantially parallel or substantially orthogonal to an extending direction of the outer shape reference and to allow the extending direction of the outer shape reference to be inclined with respect to the long-axis direction or the short-axis direction.

4. The illumination device according to claim 1, further comprising another fly-eye lens in an optical path between the light source and the light valve, wherein
the one fly-eye lens is disposed closer to the light source than the other fly-eye lens.

5. The illumination device according to claim 1, wherein
the one fly-eye lens includes the plurality of lenses on one of light entry side and light exit side or both, and
when the plurality of lenses are included on the light entry side, a periodic direction of the lenses on the light entry side is inclined with respect to the long-axis direction or the short-axis direction.

6. The illumination device according to claim 1, further comprising a housing that is allowed to contain the light source and the one fly-eye lens, wherein
a periodic direction of the lenses in the one fly-eye lens is inclined with respect to a mounting surface of the housing.

7. The illumination device according to claim 1, wherein the inclination angle is 15 degrees.

8. The illumination device according to claim 1, wherein the light source includes one or more laser diodes that emit light of a same wavelength or a different wavelength.

9. The illumination device according to claim 1, wherein
the planar shape of the illumination target region is a rectangular shape, and
the first reference direction is a direction along a side of the rectangular shape.

10. A display device comprising:
an illumination optical system;
a light valve; and
a projection lens,
wherein the illumination optical system includes
a light source,
an optical system including one fly-eye lens that includes a plurality of lenses, wherein
a first reference direction in a planar shape of an illumination target region extends along a direction substantially parallel to a long-axis direction or a short-axis direction of an intensity distribution shape of the light entering the one fly-eye lens,
the intensity distribution shape of the light entering the one fly-eye lens is elongated in the long-axis direction,
a periodic direction of an array of the lenses in the one fly-eye lens is inclined with respect to the long-axis direction or the short-axis direction,
the plurality of lenses in the one fly-eye lens each have a regular hexagonal planar shape in a plane where the lenses are disposed, and are arranged in a honeycomb pattern as a whole,
the periodic direction of the hexagonal shape lenses in the honeycomb pattern is inclined with respect to the long-axis direction or the short-axis direction without shifting of the hexagonal shape lenses in the honeycomb pattern, and
an inclination angle between a periodic direction of the lenses in the one fly-eye lens and the long-axis direction or the short-axis direction is greater than 0 degrees and smaller than 30 degrees.

11. The display device according to claim 10, wherein the one fly-eye lens has an outer shape reference linearly extending along one direction in a portion of its outer edge and wherein the one fly-eye lens is disposed to allow a periodic direction of the lenses to be inclined with respect to an extending direction of the outer shape reference and to allow the extending direction of the outer shape reference to be substantially parallel to the long-axis direction or the short-axis direction.

12. The display unit according to claim 10, wherein the illumination target region is an effective region of the light valve.

13. The display unit according to claim 12, wherein a planar shape of the effective region is a rectangular shape, and the first reference direction is a direction along a side of the rectangular shape.

14. The display device according to claim 10, wherein the light valve modulates illumination light from the illumination optical system on a basis of an image signal to emit modulated light, and the projection lens projects the modulated light from the light valve toward a projection surface.

* * * * *